US012476366B2

(12) United States Patent
Lee et al.

(10) Patent No.: US 12,476,366 B2
(45) Date of Patent: Nov. 18, 2025

(54) ANTENNA STRUCTURE AND ELECTRONIC DEVICE COMPRISING SAME

(71) Applicant: SAMSUNG ELECTRONICS CO., LTD., Suwon-si (KR)

(72) Inventors: Yoonjae Lee, Suwon-si (KR); Seongyong An, Suwon-si (KR); Sangha Lee, Suwon-si (KR); Jinwoo Jung, Suwon-si (KR); Youngjun Cho, Suwon-si (KR); Jaebong Chun, Suwon-si (KR); Sangmin Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 252 days.

(21) Appl. No.: 18/320,552

(22) Filed: May 19, 2023

(65) Prior Publication Data

US 2023/0291101 A1 Sep. 14, 2023

Related U.S. Application Data

(63) Continuation of application No. PCT/KR2021/017067, filed on Nov. 19, 2021.

(30) Foreign Application Priority Data

Nov. 19, 2020 (KR) .................. KR10-2020-0155503
Apr. 29, 2021 (KR) .................. KR10-2021-0055445

(51) Int. Cl.
*H01Q 5/357* (2015.01)
*H01Q 1/24* (2006.01)
*H01Q 13/16* (2006.01)

(52) U.S. Cl.
CPC ............. *H01Q 5/357* (2015.01); *H01Q 1/241* (2013.01)

(58) Field of Classification Search
CPC .......... H01Q 1/24; H01Q 1/241; H01Q 1/243; H01Q 13/10; H01Q 13/12; H01Q 13/16;
(Continued)

(56) References Cited

U.S. PATENT DOCUMENTS 11,470,729 B2 * 10/2022 Kim .................... H04M 1/0237
2006/0097931 A1 5/2006 Kim et al.
(Continued)

FOREIGN PATENT DOCUMENTS

JP 2012156858 A 8/2012
KR 20040110582 A 12/2004
(Continued)

OTHER PUBLICATIONS

International Search Report for PCT/KR2021/017067 mailed Feb. 25, 2022, 5 pages.
(Continued)

*Primary Examiner* — Thai Pham
(74) *Attorney, Agent, or Firm* — Nixon & Vanderhye P.C.

(57) ABSTRACT

An electronic device according to various embodiments of the present disclosure may comprise: a first housing; a second housing configured to accommodate at least a portion of the first housing and to guide a sliding motion of the first housing; a flexible display including a first display area connected to the first housing, and a second display area extending from the first display area and capable of bending or rolling; a circuit board disposed in the first housing and movable in response to the sliding motion of the first housing; an antenna structure formed on an outer surface of the second structure, and including a first part and a second part that are symmetrical about a first axis perpendicular to the sliding motion direction; and a feeding structure disposed on the circuit board configured to feed power to the antenna structure. The feeding structure is electrically con-
(Continued)

nected to a first point of the first part in a state in which the flexible display slides in, and the feeding structure is electrically connected to a second point of the second part in a state in which the flexible display slides out. The first point and the second point may be spaced apart from each other by the same distance as the first axis.

20 Claims, 21 Drawing Sheets

(58) Field of Classification Search
CPC ........ H01Q 5/357; H01Q 9/04; H01Q 9/0442; H01Q 21/30; H01Q 21/0006
See application file for complete search history.

(56) References Cited

U.S. PATENT DOCUMENTS

| | | | |
|---|---|---|---|
| 2008/0024893 A1 | 1/2008 | Vanjani et al. | |
| 2012/0194394 A1 | 8/2012 | Togashi et al. | |
| 2014/0071009 A1* | 3/2014 | Cheng | H01Q 5/378 343/770 |
| 2014/0184456 A1 | 7/2014 | Lee et al. | |
| 2016/0276742 A1 | 9/2016 | Yu et al. | |
| 2020/0119429 A1 | 4/2020 | Park et al. | |
| 2020/0153086 A1* | 5/2020 | Park | H01Q 9/0407 |
| 2021/0135492 A1* | 5/2021 | Kim | H02J 7/02 |
| 2021/0219437 A1 | 7/2021 | Kim et al. | |

FOREIGN PATENT DOCUMENTS

| | | | |
|---|---|---|---|
| KR | 20060001793 | A | 1/2006 |
| KR | 20060056456 | A | 5/2006 |
| KR | 20060112382 | A | 11/2006 |
| KR | 100658208 | B1 * | 12/2006 |
| KR | 20070001352 | A | 1/2007 |
| KR | 20070003177 | A | 1/2007 |
| KR | 20080039733 | A | 5/2008 |
| KR | 1020100116278 | A | 11/2010 |
| KR | 20140088761 | A | 7/2014 |
| KR | 20160125752 | A | 11/2016 |
| KR | 20190115888 | A | 10/2019 |
| KR | 20190143029 | A | 12/2019 |
| KR | 20200055903 | A | 5/2020 |

OTHER PUBLICATIONS

Written Opinion of the ISA for PCT/KR2021/017067 mailed Feb. 25, 2022, 5 pages.

Korean Office Action dated Jun. 20, 2025 issued in Korean Patent Application No. 10-2021-0055445, 12 pp.

* cited by examiner

ANTENNA STRUCTURE AND ELECTRONIC DEVICE COMPRISING SAME

CROSS-REFERENCE TO RELATED APPLICATIONS

This application is a continuation of International Application No. PCT/KR2021/016067 designating the United States, filed on Nov. 19, 2021, in the Korean intellectual Property Receiving Office and claiming priority to Korean Patent Application Nos. 10-2020-0155503, filed on Nov. 19, 2020, in the Korean Intellectual Property Office, and 10-2021-0055445, filed on Apr. 29, 2021, in the Korean Intellectual Property Office, the disclosures of all of which are incorporated by reference herein in their entireties.

BACKGROUND

Field

The disclosure relates to an antenna structure and an electronic device including the same.

Description of Related Art

Along with the development of electronic, information, and communication technologies, various functions have been integrated into a single portable communication device or electronic device. For example, a smartphone includes the function of an audio player, an imaging device, or an electronic organizer as well as a communication function, and may be equipped with more various functions by installing additional applications.

As the use of personal or portable communication devices such as smartphones becomes common, user demands for portability and convenience of use are increasing. For example, a touch screen display may provide a virtual keypad which serves as an output device outputting a screen, for example, visual information and substitutes for a mechanical input device (e.g., a button-type input device). As a result, portable communication devices or electronic devices may provide the same or improved usability (e.g., a larger screen), while being miniaturized. On the other hand, as flexible displays, for example, foldable or rollable displays have been commercialized, it is expected that the portability and convenience of use of electronic devices will be further improved.

In an electronic device including a flexible display extendable by sliding, structures of the electronic device may move (e.g., slide, rotate, or pivot) relative to each other. In this case, some structures (e.g., a first housing and a partial area of the flexible display) may move into or away from another structure (e.g., a second housing). When an antenna is designed in some structure (e.g., the first housing) with driving components mounted therein, the antenna may have a limited area exposable to the outside and its radiation area may be blocked by other metal components, which may make antenna implementation difficult.

SUMMARY

Embodiments of the disclosure provide an antenna structure with an improved radiation area using at least a part of an external metal structure (e.g., a second housing) of an electronic device as the antenna structure.

An electronic device according to various example embodiments of the disclosure may include: a first housing, a second housing configured to accommodate at least a part of the first housing and to guide sliding of the first housing, a flexible display including a first display area connected to the first housing and a second display area extending from the first display area and bendable or rollable, a circuit board disposed inside the first housing and slidable in response to the sliding of the first housing, an antenna structure formed on an outer surface of the second housing and including a first part and a second part latitudinally symmetrical with respect to a first axis perpendicular to a direction of the sliding, and a feeding structure disposed on the circuit board and configured to feed power to the antenna structure. The feeding structure may be electrically connected to a first point of the first part in a slide-in state of the flexible display, the feeding structure may be electrically connected to a second point of the second part in a slide-out state of the flexible display, and the first point and the second point may be spaced apart from the first axis by the same distance.

An electronic device according to various example embodiments of the disclosure may include: a first housing, a second housing configured to accommodate at least a part of the first structure and to guide sliding of the first housing, a flexible display including a first display area connected to the first housing and a second display area extending from the first display area and bendable or rollable, a circuit board disposed inside the first housing, a slot antenna structure formed on an outer surface of the second housing and having a latitudinally or longitudinally symmetrical shape, and a feeding structure disposed on the circuit board, the feeding structure being slidable in response to the sliding of the first structure, and configured to feed power to the slot antenna structure.

According to various example embodiments, it is possible to provide an electronic device in which housings make stable relative movements, and stable power feeding is maintained between an antenna structure and a feeding structure during the relative movements of the housings.

According to various example embodiments, it is possible to provide an antenna structure in an electronic device, which may maintain similar resonance characteristics between a slide-in operation and a slide-out operation of a first housing and a flexible display with respect to a second housing.

The effects achievable from the disclosure are not limited to what has been described above, and those skilled in the art will clearly understand other effects from the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
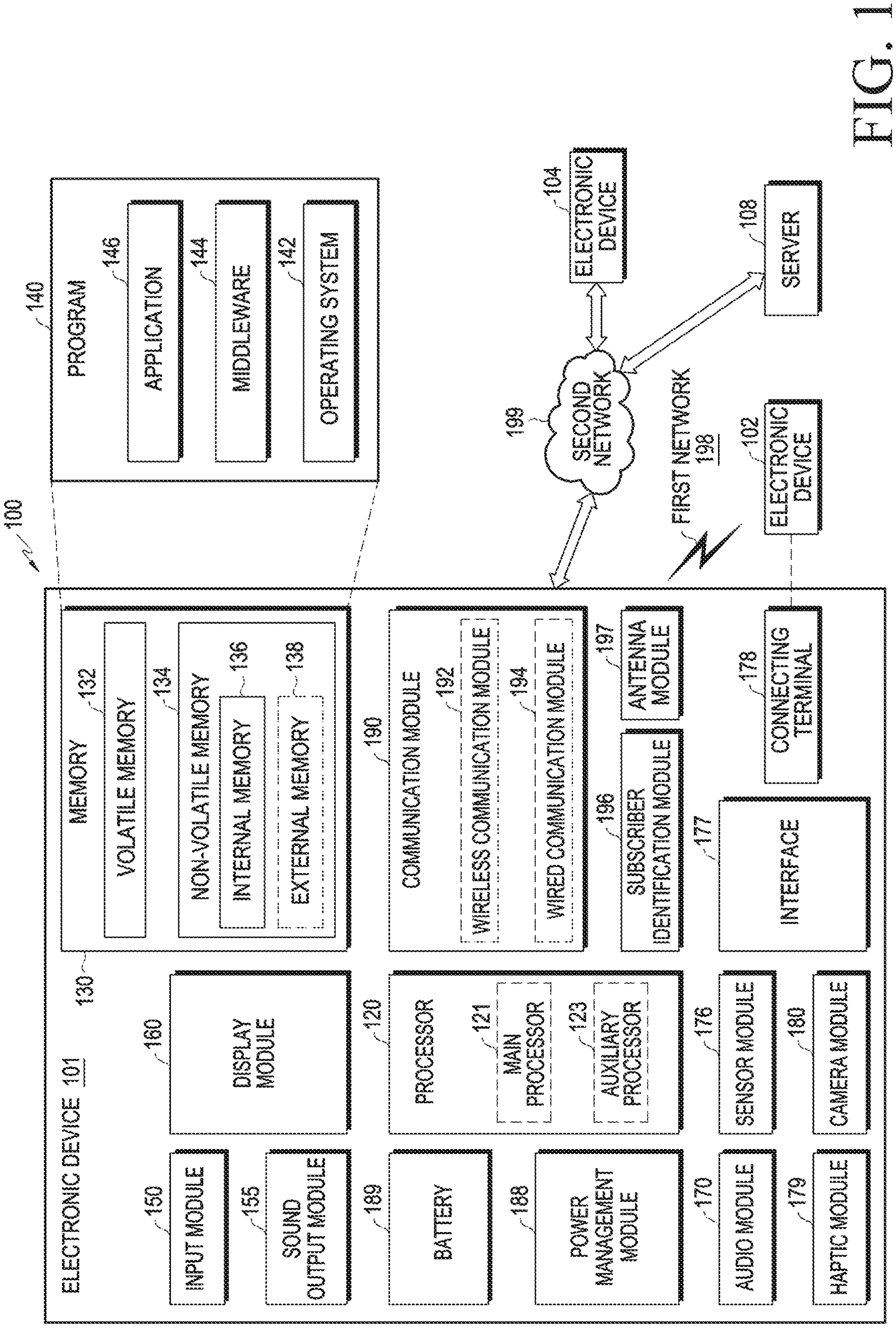
FIG. 1 is a block diagram illustrating an example electronic device in a network environment according to various embodiments.

FIG. 1 is a block diagram illustrating an example electronic device in a network environment according to various embodiments.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
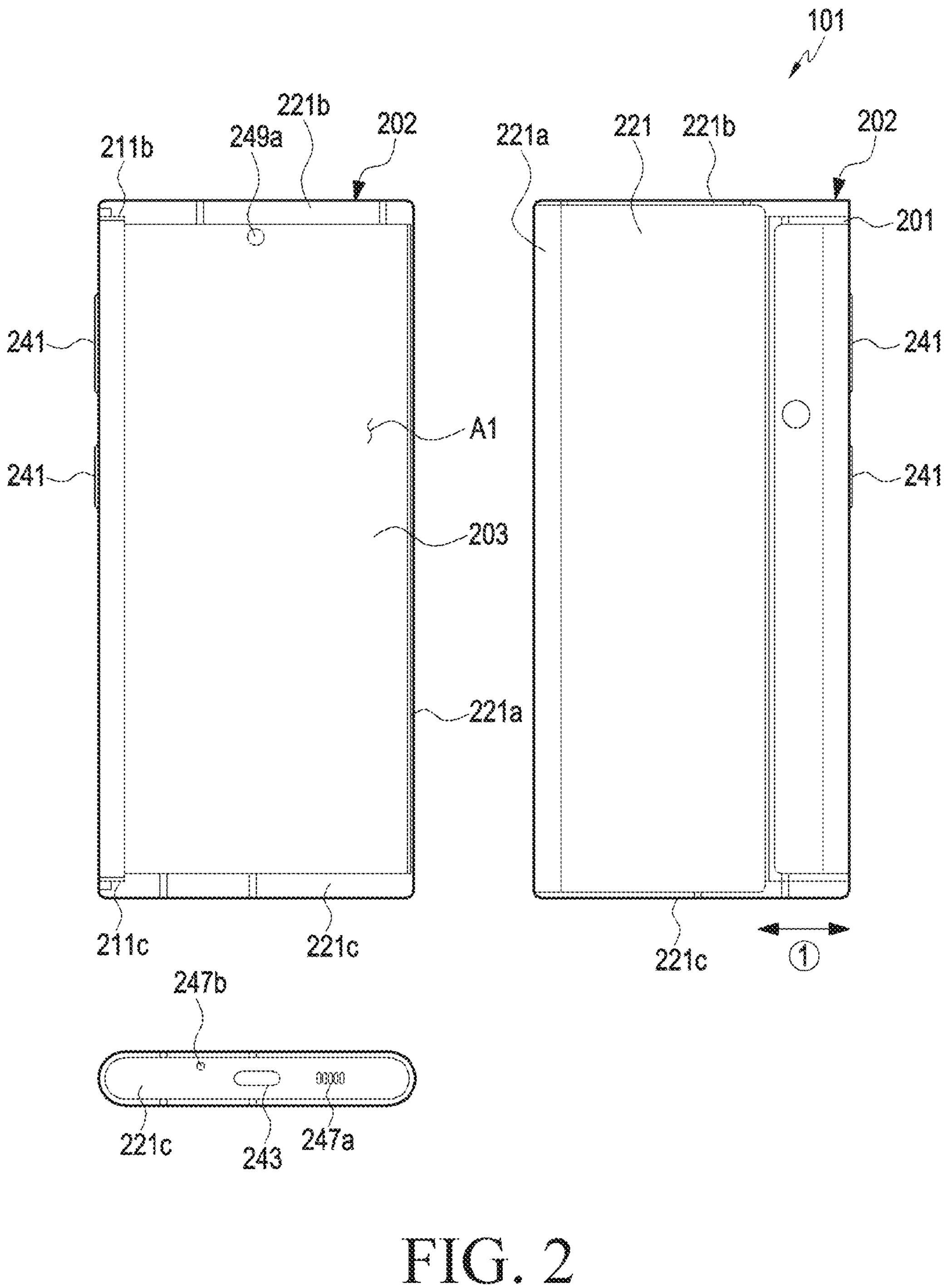
FIG. 2 is a diagram illustrating an electronic device in a state in which a second display area of a flexible display is accommodated in a second housing according to various embodiments.
Figure 3:
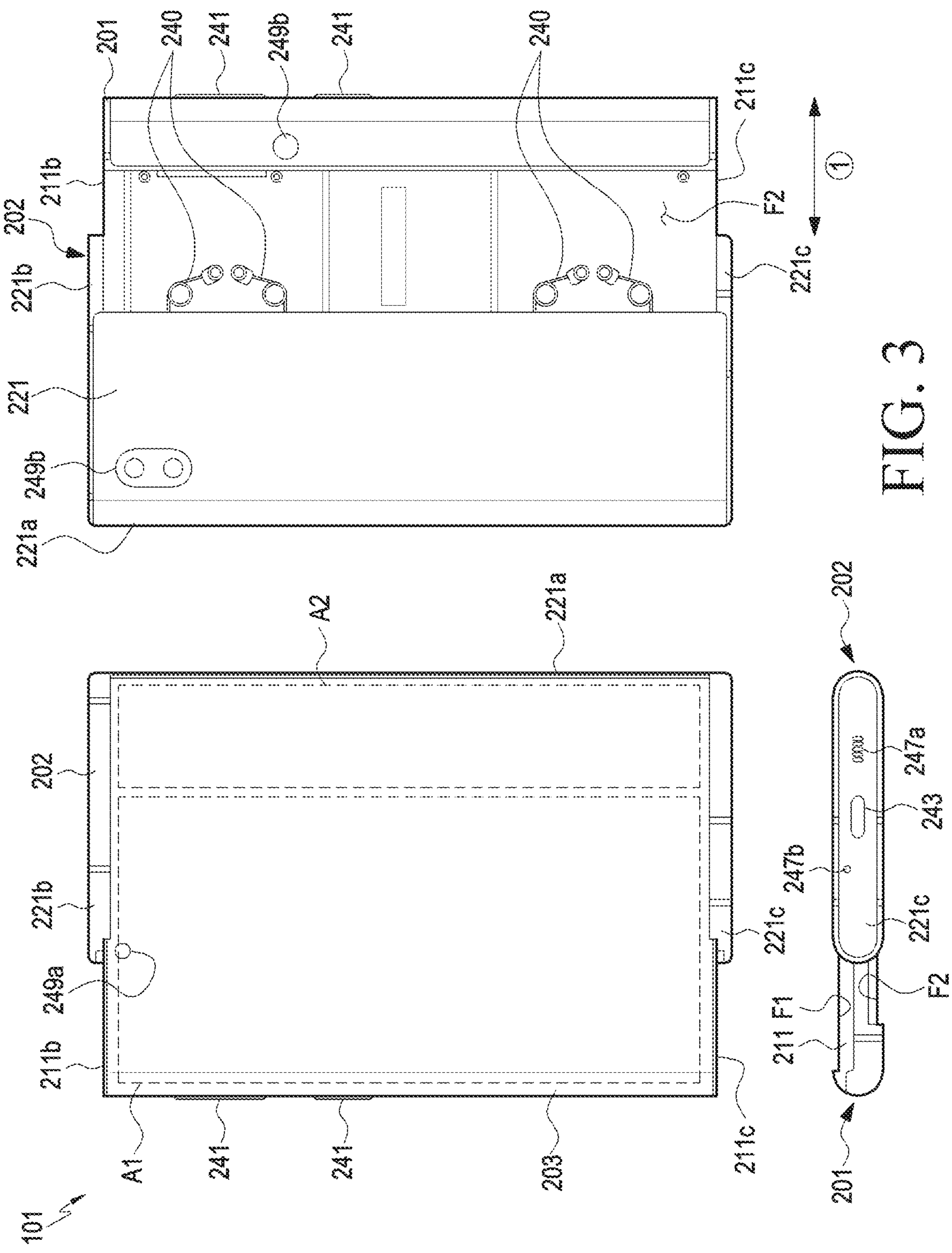
FIG. 3 is a diagram illustrating an electronic device in a state in which a second display area of a flexible display is exposed to the outside of a second housing according to various embodiments.

FIG. 2 is a diagram illustrating an example electronic device in a state in which a second display area of a flexible display is accommodated in a second housing according to various embodiments. FIG. 3 is a diagram illustrating an example electronic device in a state in which a second display area of a flexible display is exposed to the outside of a second housing according to various embodiments.

The state shown in FIG. 2 may be defined as a first housing 201 being closed with respect to a second housing 202, and the state shown in FIG. 3 may be defined as the first housing 202 being open with respect to the second housing 202. According to an embodiment, a "closed state" or an "opened state" may be defined as a state in which an electronic device is closed or opened.

Referring to FIGS. 2 and 3, the electronic device 101 may include the housings 201 and 202. The housings 201 and 202 may include the second housing 202 and the first housing 201 disposed movably relative to the second housing 202. In a certain embodiment, it may be interpreted as a structure in which the second housing 202 is disposed slidably on the first housing 201 in the electronic device 101. According to an embodiment, the first housing 201 may be disposed to reciprocate by a predetermined distance in a direction shown with respect to the second housing 202, for example, in a direction indicated by an arrow $\eta$. The configuration of the electronic device 101 of FIGS. 2 and 3 may be wholly or partially identical to that of the electronic device 101 of FIG. 1.

According to various embodiments, the first housing 201 may be referred to as, for example, a first structure, a slide part, or a slide housing, and may be disposed to be reciprocable on the second housing 202. According to an embodiment, the first housing 201 may accommodate various electric and electronic components such as a main circuit board or a battery. The second housing 202 may be referred to as, for example, a second structure, a main part, or a main housing, and may guide the movement of the first housing 101. A part (e.g., a first display area A1) of a display 203 may be seated in the first housing 201. According to an embodiment, as the first housing 201 moves (e.g., slides) with respect to the second housing 202, another part (e.g., a second display area A2) of the display 203 may be accommodated into the second housing 202 (e.g., a slide-in operation) or exposed (e.g., visible) to the outside of the second housing 202 (e.g., a slide-out operation). The terms "exposed", "visible", "visually exposed", or the like may be used interchangeably herein with reference to a display and includes a display having a cover glass, front plate, protective film, or the like.

According to various embodiments, the first housing 201 may include a first plate 211 (e.g., a slide plate). The first plate 211 may include a first surface (e.g., a first surface F1 of FIG. 4) forming at least a part of the first plate 211 and a second surface F2 facing in an opposite direction of the first surface F1. According to an embodiment, the first plate 211 may support at least a part of the display 203 (e.g., the first display area A1). According to an embodiment, the first housing 201 may include the first plate 211, a $(1\text{-}1)^{th}$ sidewall (e.g., a $(1\text{-}1)^{th}$ sidewall 211*a* of FIG. 4) extending from the first plate 211, a $(1\text{-}2)^{th}$ sidewall (e.g., a $(1\text{-}2)^{th}$ sidewall 211*b* of FIG. 4) extending from the $(1\text{-}1)^{th}$ sidewall 211*a* and the first plate 211, and a $(1\text{-}3)^{th}$ sidewall (e.g., a $(1\text{-}3)^{th}$ sidewall 211*c* of FIG. 4) extending from the $(1\text{-}1)^{th}$ sidewall 211*a* and the first plate 211 and parallel to the $(1\text{-}2)^{th}$ sidewall 211*b*.

According to various embodiments, the second housing 202 may include a second plate (e.g., a second plate 221 of FIG. 4 or a main case), a $(2\text{-}1)^{th}$ sidewall 221*a* extending from the second plate 221, a $(2\text{-}2)^{th}$ sidewall 221*b* extending from the $(2\text{-}1)^{th}$ sidewall 221*a* and the second plate 221, and a $(2\text{-}3)^{th}$ sidewall 221*c* extending from the $(2\text{-}1)^{th}$ sidewall 221*a* and the second plate 221 and parallel to the $(2\text{-}2)^{th}$ sidewall 221*b*. According to an embodiment, the $(2\text{-}2)^{th}$ sidewall 221*b* and the $(2\text{-}3)^{th}$ sidewall 221*c* may be perpendicular to the $(2\text{-}1)^{th}$ sidewall 221*a*. According to an embodiment, the second plate 221, the $(2\text{-}1)^{th}$ sidewall 221*a*, the $(2\text{-}2)^{th}$ sidewall 221*b*, and the $(2\text{-}3)^{th}$ sidewall 221*c* may be opened at one side (e.g., a front face surface) to accommodate (or surround) at least a part of the first housing 201. For example, the first housing 201 may be coupled with the second housing 202, while being at least partially surrounded, and slide in a direction parallel to the first surface F1 or the second surface F2, for example, in the direction of the arrow ① under the guidance of the second housing 202. According to an embodiment, the second plate 221, the (2-1)$^{th}$ sidewall 221*a*, the (2-2)$^{th}$ sidewall 221*b* and/or the (2-3)$^{th}$ sidewall 221*c* may be integrally formed. According to an embodiment, the second plate 221, the second plate 221, the (2-1)$^{th}$ sidewall 221*a*, the (2-2)$^{th}$ sidewall 221*b* and/or the (2-3)$^{th}$ sidewall 221*c* may be formed as separate housings and combined or assembled with each other.

According to various embodiments, the second plate 221 and/or the (2-1)$^{th}$ sidewall 221*a* may cover at least a part of the flexible display 203. For example, at least a part of the flexible display 203 may be accommodated inside the second housing 202, and the second plate 221 and/or the (2-1)$^{th}$ sidewall 221*a* may cover the part of the flexible display 203 accommodated inside the second housing 202.

According to various embodiments, the first housing 201 may move to the opened state and the closed state with respect to the second housing 202 in a first direction (e.g., the direction ① parallel to the (2-2)$^{th}$ sidewall 221*b* or the (2-3)$^{th}$ sidewall 221*c*. The first housing 201 may be located at a first distance from the (2-1)$^{th}$ sidewall 221*a* in the closed state, and at a second distance greater than the first distance from the (2-1)$^{th}$ sidewall 221*a* in the opened state. In a certain embodiment, the first housing 201 may surround a part of the (2-1)$^{th}$ sidewall 221*a* in the closed state.

According to various embodiments, the electronic device 101 may include the display 203, a key input device 241, a connector hole 243, audio modules 247*a* and 247*b*, or camera modules 249*a* and 249*b*. Although not shown, the electronic device 101 may further include an indicator (e.g., an LED device) or various sensor modules. The configurations of the display 203, the audio modules 247*a* and 247*b*, and the camera modules 249*a* and 249*b* of FIGS. 2 and 3 may be wholly or partially identical to those of the display module 160, the audio module 170, and the camera module 180 of FIG. 1.

According to various embodiments, the display 203 may include the first display area A1 and the second display area A2. According to an embodiment, the first display area A1 may be disposed on the first housing 201. For example, the first display area A1 may extend substantially across at least a part of the first surface F1 and be disposed on the first surface F1. The second display area A2 may extend from the first display area A1, and may be inserted or accommodated into the second housing 202 (e.g., a structure) or exposed (e.g., visible) to the outside of the second housing 202 according to the sliding of the first housing 201.

According to various embodiments, the second display area A2 may be accommodated into the second housing 202 or a space formed between the first housing 201 and the second housing 202 or exposed (e.g., visible) to the outside by moving substantially under the guidance of a roller (e.g., a roller 250 of FIG. 4) mounted in the first housing 201. According to an embodiment, the second display area A2 may move based on the sliding of the first housing 201 in the first direction (e.g., the direction indicated by the arrow 11). For example, while the first housing 201 slides, a part of the second display area A2 may be deformed into a curved shape at a position corresponding to the roller 250.

According to an embodiment, when viewed from above the first plate 211 (e.g., the slide plate), if the first housing 201 moves from the closed state to the opened state, the second display area A2 may form a substantially flat surface together with the first display area A1, while being gradually exposed (e.g., made visible) to the outside of the second housing 202. The display 203 may be coupled with or disposed adjacent to a touch sensing circuit, a pressure sensor capable of measuring the intensity (pressure) of a touch, and/or a digitizer detecting a magnetic stylus pen. In an embodiment, regardless of the closed state or the opened state, an exposed (e.g., visible) part of the second display area A2 may be located on the roller (e.g., the roller 250 of FIG. 4), and a part of the second display area A2 may maintain a curved shape at a position corresponding to the roller 250.

According to one of various embodiments, the electronic device 200 may include at least one hinge structure 240. The hinge structure 240 may connect the first housing 201 and the second housing 202 to each other. For example, the hinge structure 240 may be connected to the first plate 211 and the second plate 221. According to an embodiment, the hinge structure 240 may transmit a driving force for guiding the sliding of the first housing 201 to the first housing 201. For example, the hinge structure 240 may include an elastic material (e.g., a spring), and provide an elastic force in the first direction (e.g., the direction θ in FIG. 3) based on the sliding of the first housing 201. According to an embodiment, the hinge structure 240 may be omitted.

According to various embodiments, the key input device 241 may be located in one area of the first housing 210. Depending on appearance and a use condition, the electronic device 101 may be designed to be without the illustrated key input device 241 or to include additional key input device(s). According to an embodiment, the electronic device 101 may include a key input device not shown, for example, a home key button or a touch pad disposed around the home key button. According to an embodiment, at least a part of the key input device 245 may be disposed on the (2-1)$^{th}$ sidewall 221*a*, the (2-2)$^{th}$ sidewall 221*b*, or the (2-3)$^{th}$ sidewall 221*c* of the second housing 202.

According to various embodiments, the connector hole 243 may be omitted and accommodate a connector (e.g., a USB connector) to transmit and receive power and/or data to and from an external electronic device. Although not shown, the electronic device 101 may include a plurality of connector holes 243, and some of the plurality of connector holes 243 may function as a connector hole for transmitting and receiving an audio signal to and from an external electronic device. Although the connector hole 243 is located on the (2-3)$^{th}$ sidewall 221*c* in the illustrated embodiment, to which the disclosure is not limited, the connector hole 243 or a connector hole not shown may be located on the (2-1)$^{th}$ sidewall 221*a* or the (2-2)$^{th}$ sidewall 221*b*.

According to various embodiments, the audio modules 247*a* and 247*b* may include at least one speaker hole 247*a* or at least one microphone hole 247*b*. One of the speaker holes 247*a* may be provided as a receiver hole for voice calls, and another may be provided as an external speaker hole. The electronic device 101 may include a microphone for obtaining sound, and the microphone may obtain external sound of the electronic device 101 through the microphone hole 247*b*. According to an embodiment, the electronic device 101 may include a plurality of microphones to detect the direction of sound. According to an embodiment, the electronic device 101 may include an audio module in which the speaker hole 247*a* and the microphone hole 247*b* are implemented as one hole, or may include a speaker (e.g., a piezo speaker) without the speaker hole 247*a*.

According to various embodiments, the camera modules 249*a* and 249*b* may include a first camera module 249*a* (e.g., a front camera) and a second camera module 249*b*. The second camera module 249*a* may be located in the first housing 201 and capture a subject from a direction opposite to the first display area A1 of the display. The electronic device 101 may include a plurality of camera modules 249*a* and 249*b*. For example, the electronic device 101 may include at least one of a wide-angle camera, a telephoto camera, or a close-up camera, and according to an embodiment, the electronic device 101 may measure a distance to a subject by including an IR projector and/or an IR receiver. The camera modules 249*a* and 249*b* may include one or more lenses, an image sensor, and/or an image signal processor. The first camera module 249*a* may be disposed to face in the same direction as the display 203. For example, the first camera module 249*a* may be disposed around the first display area A1 or in an area overlapping with the display 203. When the first camera module 249*a* is disposed in an area overlapping with the display 203, the first camera module 249*a* may capture a subject through the display 203.

According to an embodiment, an indicator (not shown) of the electronic device 101 may be disposed in the first housing 201 or the second housing 202 and include an LED to provide state information about the electronic device 101 as a visual signal. A sensor module (not shown) of the electronic device 101 may generate an electrical signal or data value corresponding to an internal operating state of the electronic device 101 or an external environmental state. The sensor module may include, for example, a proximity sensor, a fingerprint sensor, or a biometric sensor (e.g., an iris/face recognition sensor or an HRM sensor). In an embodiment, the sensor module may further include, for example, at least one of a gesture sensor, a gyro sensor, a barometric pressure sensor, a magnetic sensor, an acceleration sensor, a grip sensor, a color sensor, an IR sensor, a temperature sensor, a humidity sensor, or an illuminance sensor.

Figure 4:
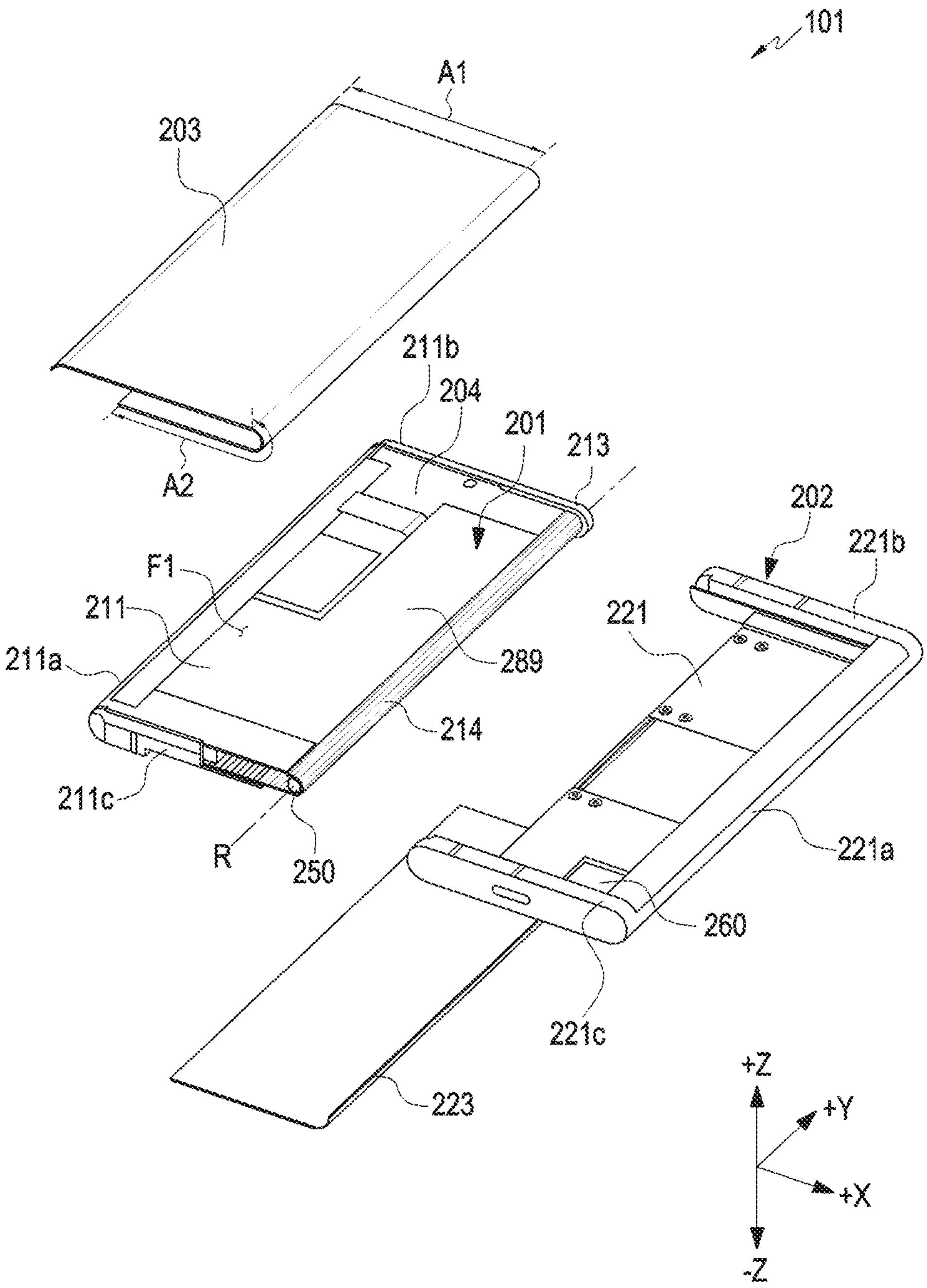
FIG. 4 is an exploded perspective view illustrating an electronic device according to various embodiments.

FIG. 4 is an exploded perspective view illustrating an electronic device according to various embodiments.

Referring to FIG. 4, the electronic device 101 may include the first housing 201, the second housing 202, the display 203 (e.g., a flexible display, a foldable display, or a rollable display), the roller 250, and a multi-joint hinge structure 213. A part (e.g., the second display area A2) of the display 203 may be accommodated into the electronic device 101 under the guidance of the roller 250.

The configurations of the first housing 201, the second housing 202, and the display 203 of FIG. 4 may be wholly or partially identical to those of the first housing 201, the second housing 202, and the display 203 of FIGS. 2 and 3.

According to various embodiments, the first housing 201 may include the first plate 211. The first plate 211 may be mounted in the second housing 202 and linearly reciprocate in one direction (e.g., in the arrowed direction $\eta$ in FIG. 1) under the guidance of the second housing 202. According to an embodiment, the first plate 211 may include the first surface F1, and the first display area A1 of the display 203 may be substantially mounted on the first surface F1 and maintained in the shape of a flat plate. According to an embodiment, the first plate 211 may be formed of a metal material and/or a non-metal (e.g., polymer) material. According to an embodiment, the first plate 211 may accommodate components (e.g., a battery 289 (e.g., the battery 189 of FIG. 1) and a circuit board 204) of the electronic device 101.

According to various embodiments, the multi-joint hinge structure 213 may be connected to the first housing 201. For example, as the first housing 201 slides, the multi-joint hinge structure 213 may move with respect to the second housing 202. In the closed state (e.g., FIG. 2), the multi-joint hinge structure 213 may be accommodated substantially inside the second housing 202. According to an embodiment, at least a part of the multi-joint hinge structure 213 may be located between the first plate 211 of the first housing 201 and the second plate 221 and/or the (2-1)$^{th}$ sidewall 221*a* of the second housing 202 and move in response to the roller 250.

According to various embodiments, the multi-joint hinge structure 213 may include a plurality of bars or rods 214. The plurality of rods 214 may extend in a straight line, be disposed parallel to a rotation axis R of the roller 250, and be arranged along a direction perpendicular to the rotation axis R (e.g., a direction in which the first housing 201 slides).

According to various embodiments, each rod 214 may revolve around an adjacent rod 214 while remaining parallel to the other adjacent rod 214. According to an embodiment, as the first housing 201 slides, the plurality of rods 214 may be arranged in a curved shape or in a flat shape. For example, as the first housing 201 slides, a part of the multi-joint hinge structure 213 facing the roller 250 may form a curved surface, and another part of the multi-joint hinge structure 213 not facing the roller 250 may form a flat surface. According to an embodiment, the second display area A2 of the display 203 may be mounted on or supported by the multi-joint hinge structure 213, and in the opened state (e.g., FIG. 3), at least a part of the second display area A2 together with the first display area A1 may be exposed (e.g., visible) to the outside of the second housing 202. In the state where the second display area A2 is exposed (e.g., visible) to the outside of the second housing 202, the multi-joint hinge structure 213 may support or maintain the second display area A2 in the flat state by forming a substantially flat surface. According to an embodiment, the multi-joint hinge structure 213 may be replaced with a flexible integral support member (not shown).

According to various embodiments, the second housing 202 may include a third plate 223. According to an embodiment, the third plate 223 may substantially form at least a part of the exterior of the second housing 202 or the electronic device 101. For example, the third plate 223 may be coupled with an outer surface of the second plate 221. According to an embodiment, the third plate 223 may be integrally formed with the second plate 221. According to an embodiment, the third plate 223 may provide a decorative effect on the exterior of the electronic device 101. The second plate 221 may be made of at least one of a metal or a polymer, and the third plate 223 may be made of at least one of a metal, glass, a synthetic resin, or ceramic. According to an embodiment, the second plate 221 and/or the third plate 223 may be made of a material that transmits light at least partially (e.g., an auxiliary display area). For example, in a state where a part (e.g., the second display area A2) of the display 203 is accommodated inside the electronic device 101, the electronic device 101 may output visual information using the second display area A2. The auxiliary display area may be a part of the second plate 221 and/or the third plate 223 where the display 203 accommodated inside the second housing 202 is located.

According to various embodiments, the roller 250 may be disposed inside the first housing 201. For example, the roller 250 may be rotatably mounted on an edge of the first plate 211 of the first housing 201. According to an embodiment, the roller 250 may guide rotation of the second display area A2 while rotating along the rotation axis R.

According to various embodiments, the electronic device 101 may include a speaker module 260. The speaker module 260 may be disposed on the second housing 202. The configuration of the speaker module 260 of FIG. 4 may be wholly or partially identical to that of the audio module 170 of FIG. 1.

Figure 5:
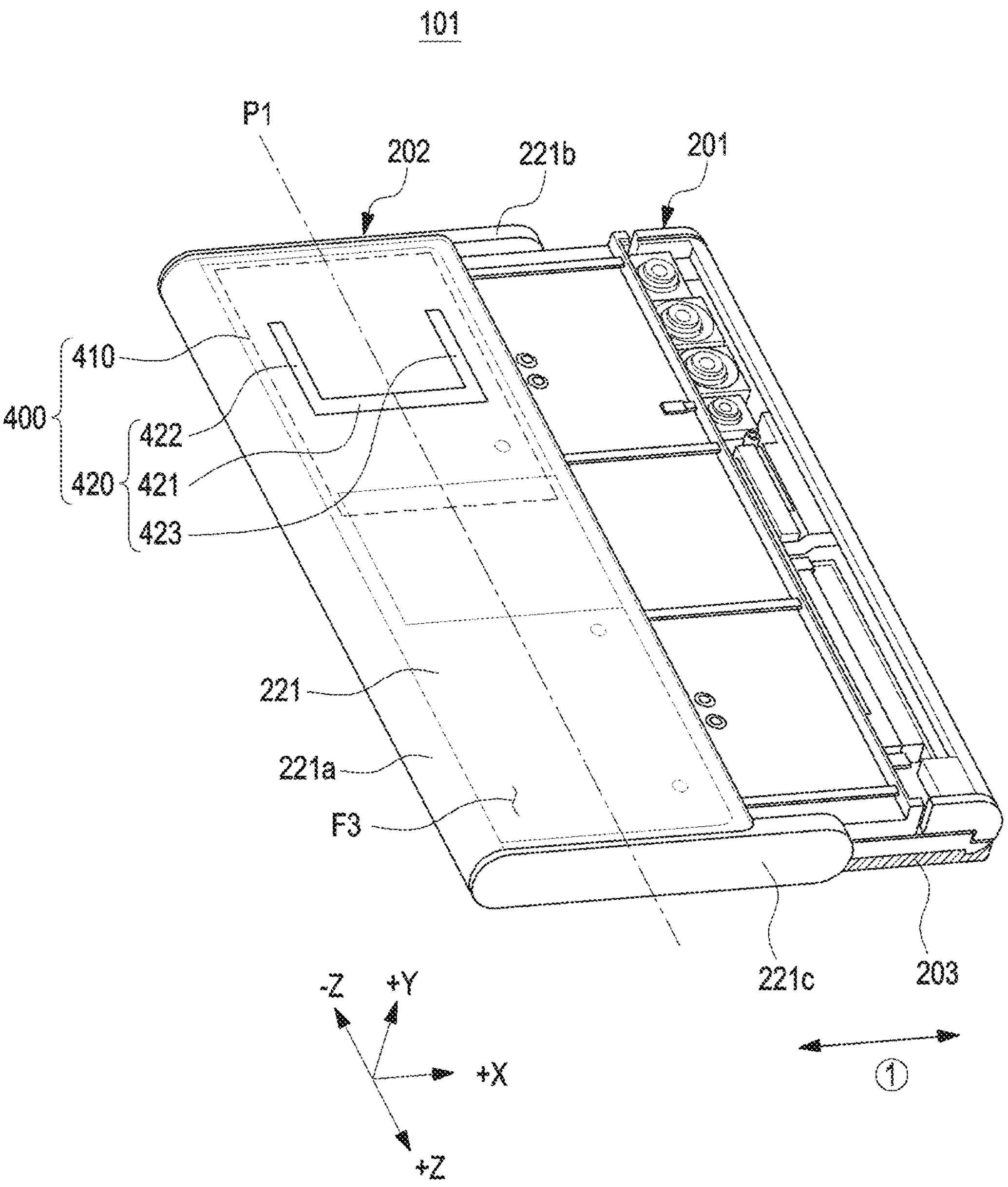
FIG. 5 is a perspective view illustrating an antenna structure formed on one surface of a second housing in an opened state of an electronic device according to various embodiments.

FIG. 5 is a perspective view illustrating an antenna structure formed on one surface of a second housing in an opened state of an electronic device according to various embodiments.

Figure 6:
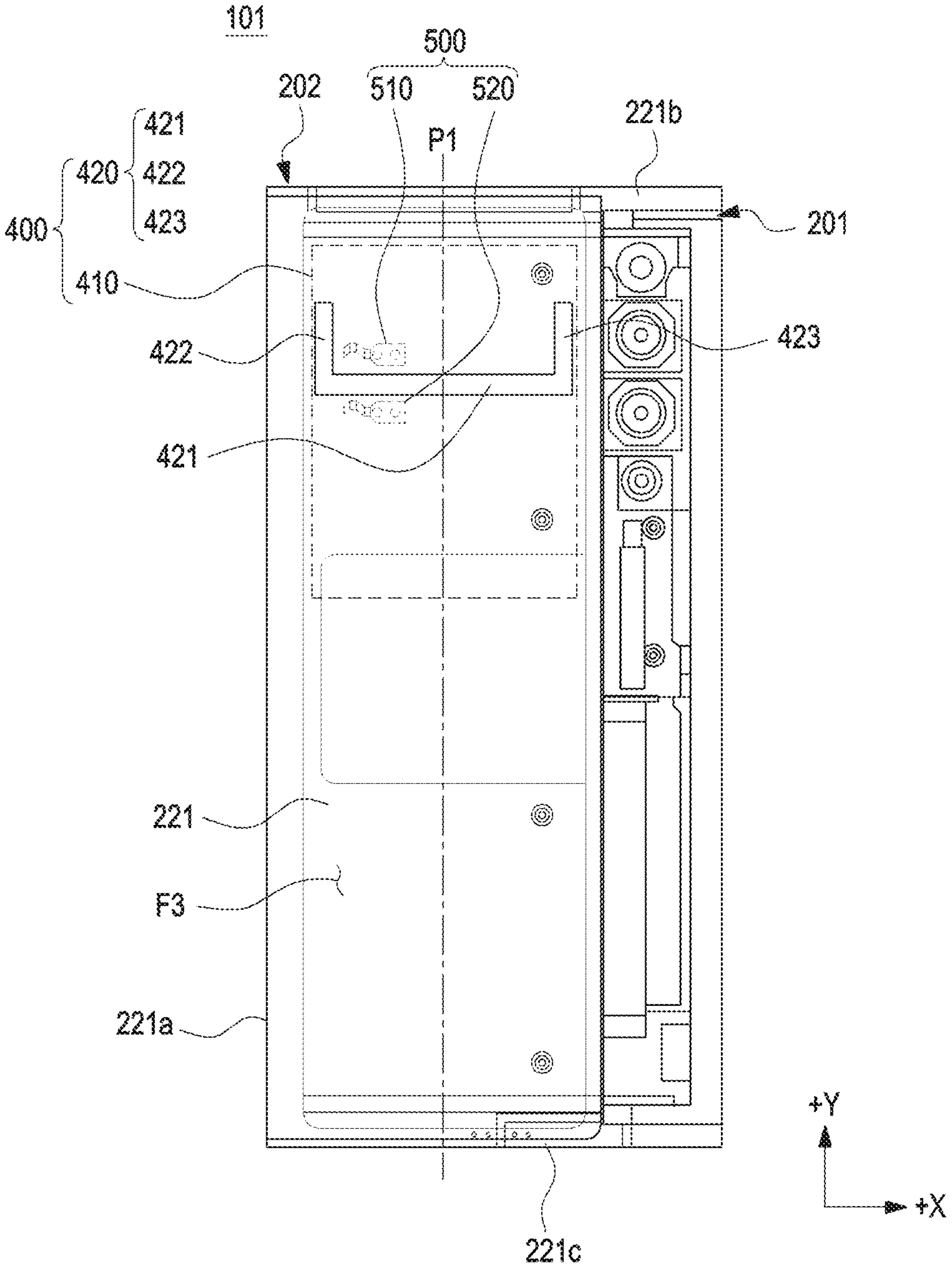
FIG. 6 is a diagram illustrating a rear view of an electronic device illustrating an antenna structure formed on one surface of a second housing in a closed state of an electronic device according to various embodiments.

FIG. 6 is a diagram illustrating an antenna structure formed on one surface of a second housing in a closed state of an electronic device according to various embodiments.

Figure 7:
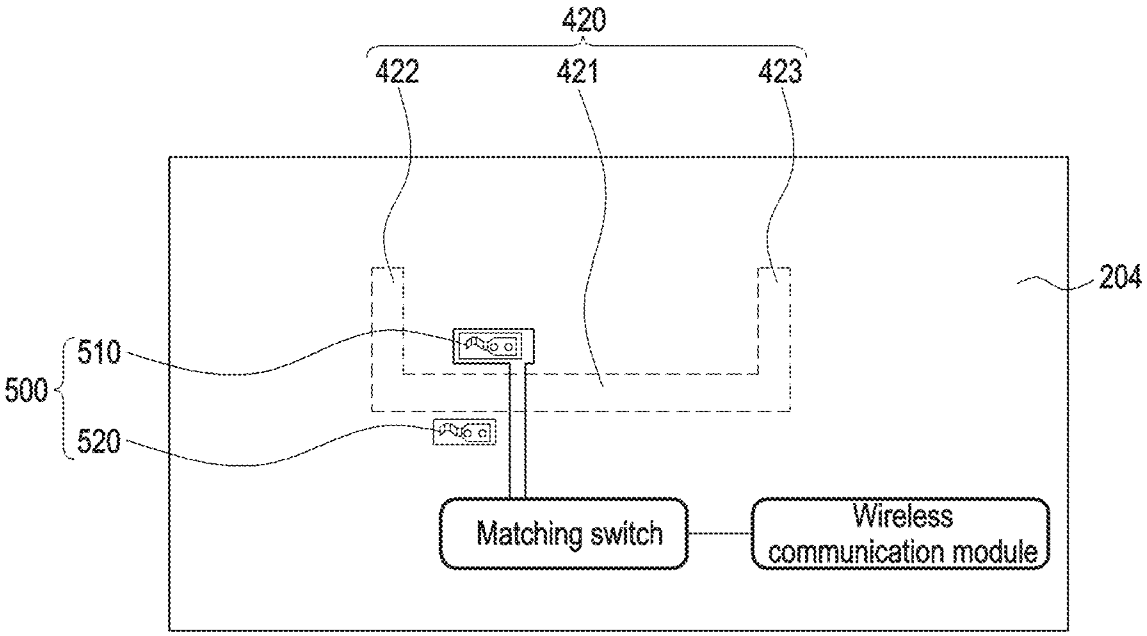
FIG. 7 is a projection view illustrating a feeding structure disposed on a printed circuit board according to various embodiments.

FIG. 7 is a diagram illustrating a feeding structure disposed on a printed circuit board according to various embodiments.

Figure 8:
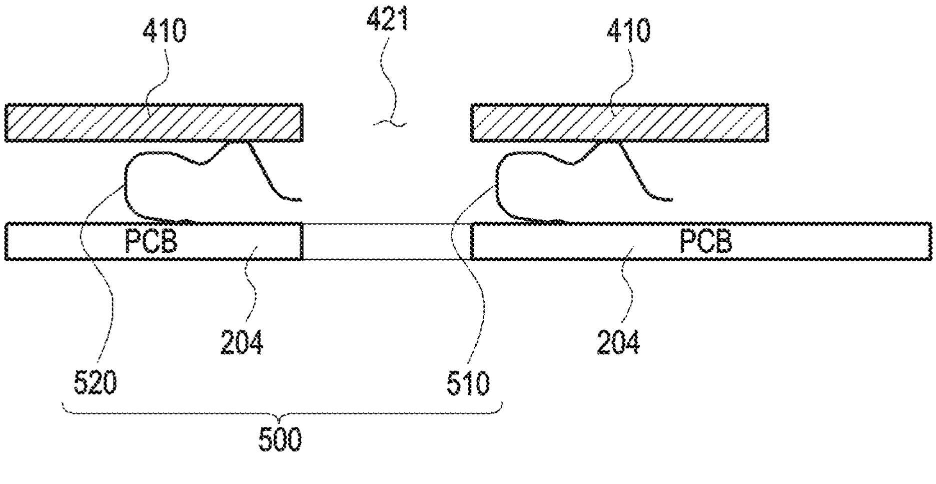
FIG. 8 is a cross-sectional view illustrating an antenna structure and a feeding structure in an electronic device according to various embodiments.

FIG. 8 is a cross-sectional view illustrating an antenna structure and a feeding structure in an electronic device according to various embodiments.

FIGS. 5, 6 and 7 are views illustrating internal components exposed by excluding a rear cover (e.g., the third plate 223 of FIG. 4) from the exterior of the electronic device.

According to various embodiments, the electronic device 101 may include the first housing 201, the second housing 202, the main circuit board 203, an antenna structure 400, and a feeding structure 500. The electronic device 101 may further include various components (e.g., a flexible display, a camera module, and a battery) disposed inside the first housing 201.

The configurations of the first housing 201 and the second housing 202 of FIGS. 5 to 8 may be wholly or partially identical to those of the first housing 201 and the second housing 202 of FIGS. 2, 3 and 4.

According to various embodiments, as the first housing 201 (and the flexible display (not shown) connected to the first housing 201) slides in and out with respect to the second housing 202, the closed state or the opened state may be set.

According to various embodiments, the second housing 202 may include the second plate 221, the (2-1)$^{th}$ sidewall 221*a* extending from the second plate 221 and forming an edge portion of the second housing 202, the (2-2)$^{th}$ 221*b*, and the (2-3)$^{th}$ sidewall 221*c*. The second plate 221 may include a first surface F3 facing in a —Z-axis direction and a second surface (not shown) facing in a +Z-axis direction. The first surface F3 may be configured to face the rear surface of the electronic device 101, and form the exterior of the electronic device, together with at least a part of the third plate (e.g., the third plate 223 of FIG. 4). For example, the second plate 221 may be made of at least one of a metal or a polymer, and the third plate 223 may be made of at least one of a metal, glass, a synthetic resin, or ceramic.

According to various embodiments, the antenna structure 400 may be formed in at least a partial area of the first surface F3 of the second plate 221. The antenna structure 400 may include a conductive part 410 and a slot part 420 formed in an area of the conductive part 410. The conductive part 410 may be a part of the second plate 221 formed of a metal material, and the slot part 420 may be formed in an inner area (e.g., a central area) of the conductive part 410. For example, the conductive part 410 may have a size of about half of the first surface F3 of the second plate 221, and the slot part 420 may be an opening formed to penetrate at least a part of the first surface F3. However, the number and/or size of slot parts 420 is not limited to a specific number and/or size, and various design modifications may be made thereto.

According to an embodiment, the slot part 420 of the antenna structure 400 may be latitudinally symmetrical in shape with respect to a first axis P1 perpendicular to the sliding direction (the first direction (e.g., the direction ①)) of the flexible display 203 (and the first housing 201). For example, the first axis P1 may be set as an imaginary line crossing the center of the first surface F3 or an area adjacent to the center. In another example, the first axis P1 may be set as an imaginary line disposed parallel to the (2-1)$^{th}$ sidewall 221*a* along the first surface F3.

According to an embodiment, the slot part 420 may include a first part and a second part symmetrical latitudinally with respect to the first axis P1. For example, the slot part 420 may formed in an opening structure, and may be a structure including a bent portion at one side. In another example, the slot part 420 may be in the shape of '⊔' or '⊓'. In another example, the slot part 420 may include a first slot part 421 perpendicular to the first axis P1, a second slot part 422 extending from one end of the first slot part 420, and a third slot part 423 extending from the other end of the first slot part 420. The second slot part 420 and the third slot part 420 may be formed parallel to the first axis P1 and spaced apart from each other. However, the slot part 420 may be a recess structure or a shape with an opened partial area and another stepped partial area, not limited to the opening structure. Besides, the slot part 420 may be modified in design in various structures which are symmetrical with respect to the first axis P1 and have similar resonance characteristics according to power feeding positions.

According to various embodiments, the feeding structure 500 may be electrically connected to the main circuit board 204 (e.g., the circuit board 204 of FIG. 4) in the first housing 201, and feed power received from the main circuit board 204 to the antenna structure 400. For example, a part of the feeding structure 500 facing in the +Z axis direction may be fixedly disposed on the main circuit board 204, and the other part thereof facing in the −Z axis direction may be disposed in an area adjacent to the slot part 420 of the antenna structure 400.

According to an embodiment, as the feeding structure 500 is located inside the first housing 201, the feeding structure 500 may slide in response to sliding of the first housing 201 (and the flexible display 203). According to an embodiment, the feeding structure 500 may be designed to be fixedly disposed in an area of the main circuit board 204, so that the feeding structure 500 is always electrically connected to the antenna structure 400 and feeds power to the antenna structure, regardless of sliding of the first housing 201 with respect to the second housing 202. For example, in the closed state of the first housing 201 with respect to the second housing 202, the feeding structure 500 may be electrically connected to a first point of the first slot part 420. In another example, in the opened state of the first housing 201 with respect to the second housing 202, the feeding structure 500 may be electrically connected to a second point of the first slot part 420.

According to an embodiment, the feeding structure 500 may include a plurality of feeding structures. For example, when internal structures are viewed through from above the electronic device 101, the feeding structure 500 may include a first feeding member 510 and a second feeding member 520 spaced apart from each other, with the slot part 420 (e.g., the first slot part 421) interposed therebetween. The first feeding member 510 may include a feeding line to feed power to the antenna structure 400, and the second feeding member 520 may include a ground line to provide a ground to the antenna structure 400. For example, the first feeding member 510 may be connected to a wireless communication module (e.g., including wireless communication circuitry) of the main circuit board 204 through a matching switch and transmit and receive RF signals.

According to an embodiment, the feeding structure 500 may be formed to include a conductive material for an electrical connection to the conductive part 410 of the antenna structure 400, and include at least one of, for example, a C-clip, a pogo pin, a ball bearing, or a conductive plate.

According to an embodiment, the feeding structure 500 may be designed to be directly or indirectly connected to a structure for power feeding (e.g., the antenna structure 400) even during sliding. For example, the feeding structure 500 may directly contact an area of the conductive part 410 of the antenna structure 400 to feed power. In another example, as the feeding structure 500 is disposed adjacent to the slot part 420 of the antenna structure 400, spaced apart from the slot part 420, the feeding structure 500 may feed power to the antenna structure 400 by coupling.

Figure 9:
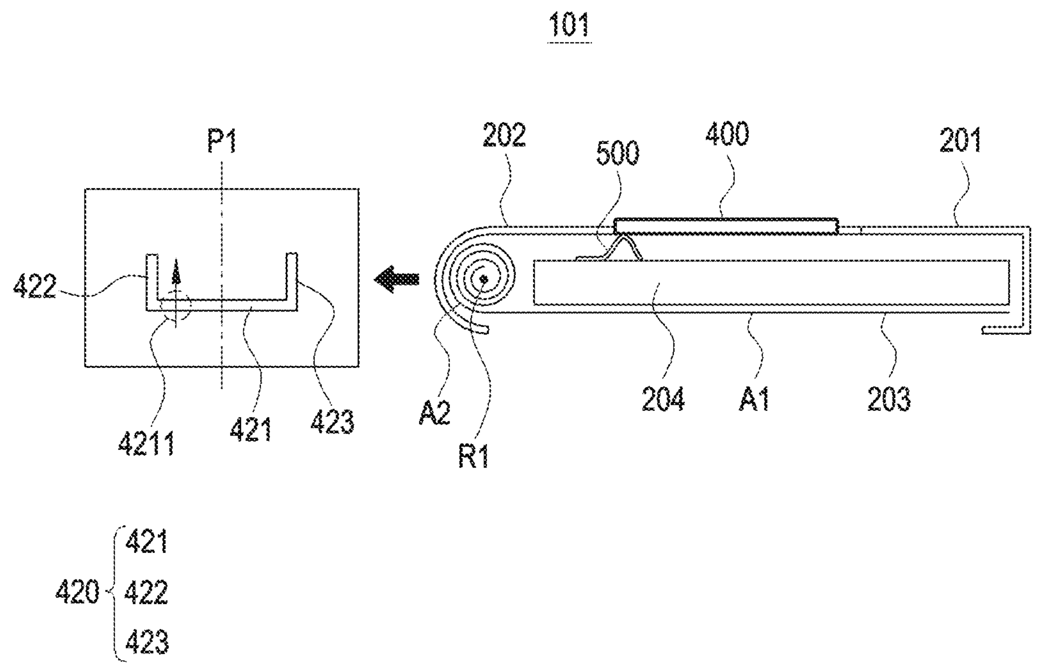
FIG. 9 is a diagram illustrating a connection relationship between an antenna structure and a feeding structure in a closed state of an electronic device according to various embodiments.

FIG. 9 is a diagram illustrating a connection relationship between an antenna structure and a feeding structure in a closed state of an electronic device according to various embodiments.

Figure 10:
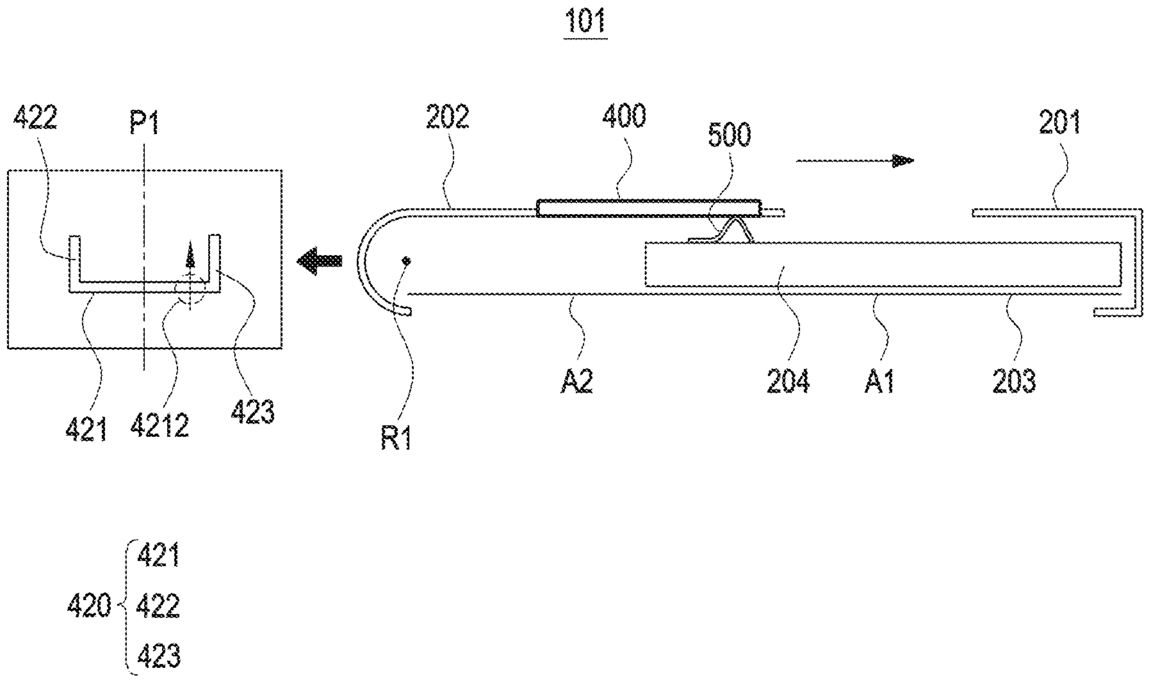
FIG. 10 is a diagram illustrating a connection relationship between an antenna structure and a feeding structure in an open state of an electronic device according to various embodiments.

FIG. 10 is a diagram illustrating a connection relationship between an antenna structure and a feeding structure in an opened state of an electronic device according to various embodiments.

Figure 11A:
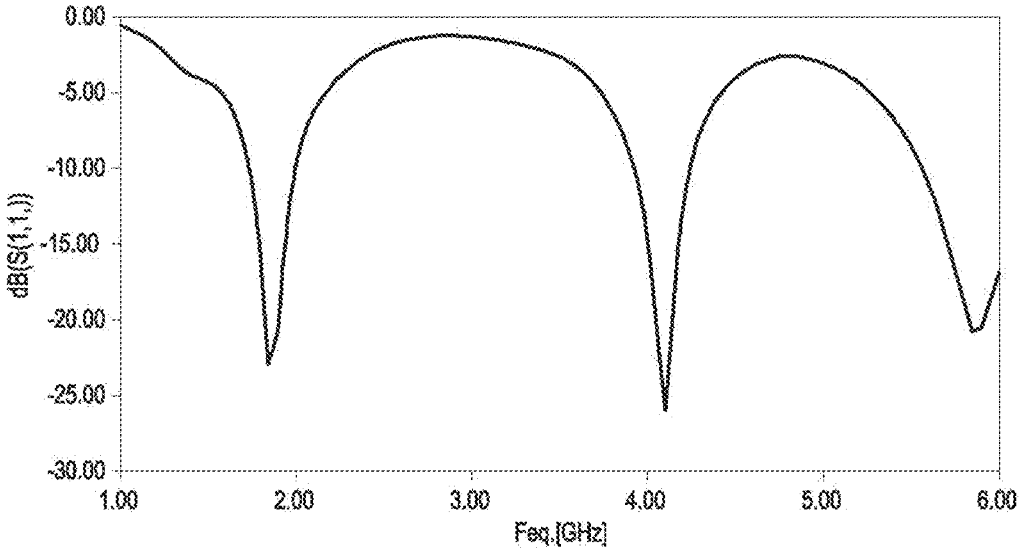
FIGS. 11A and 11B are a graph and a current distribution diagram illustrating resonance characteristics according to connection positions between an antenna structure and a feeding structure in a closed state of an electronic device according to various embodiments.
Figure 11B:
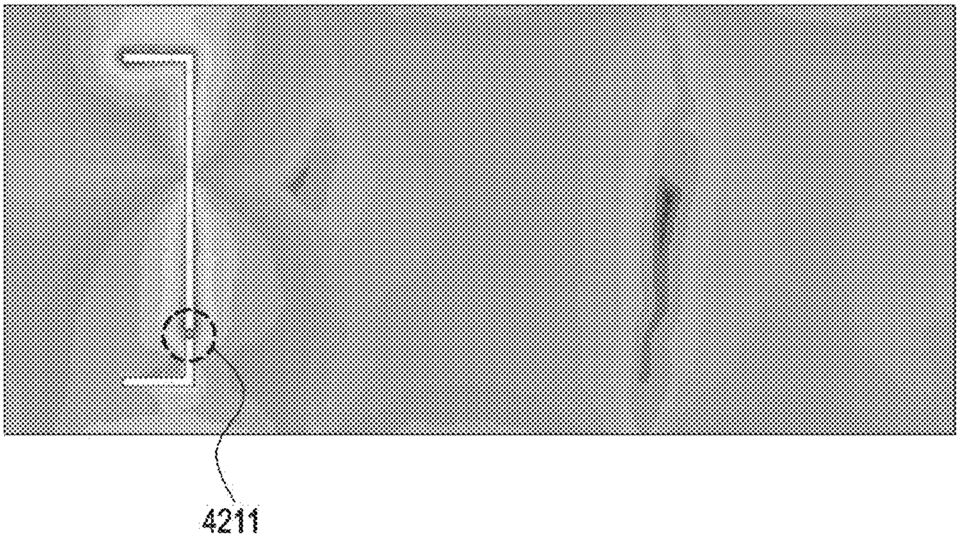

FIGS. 11A and 11B are a graph and a current distribution diagram illustrating resonance characteristics according to connection positions between an antenna structure and a feeding structure in a closed state of an electronic device according to various embodiments.

Figure 12A:
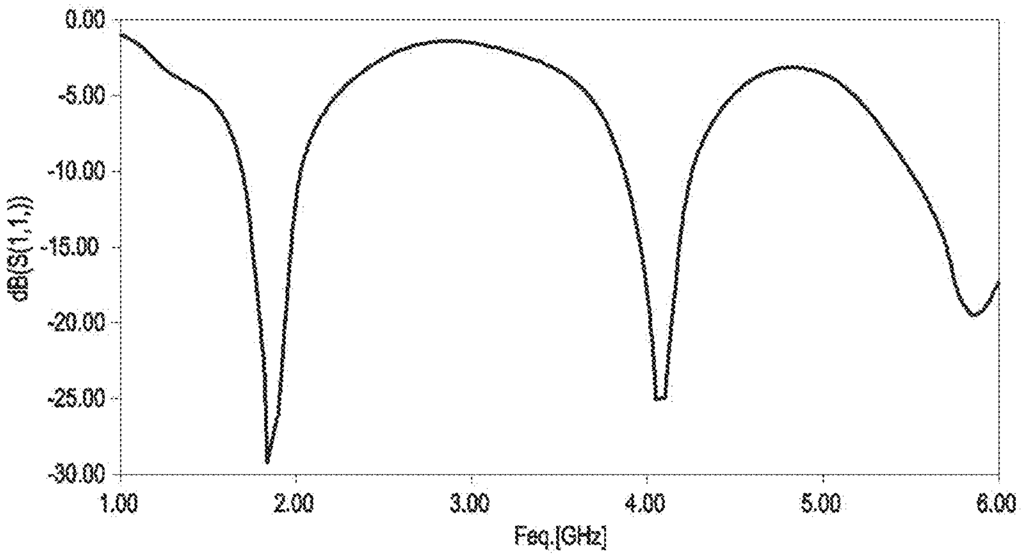
FIGS. 12A and 12B are a graph and a current distribution diagram illustrating resonance characteristics according to connection positions between an antenna structure and a feeding structure in an opened state of an electronic device according to various embodiments.
Figure 12B:
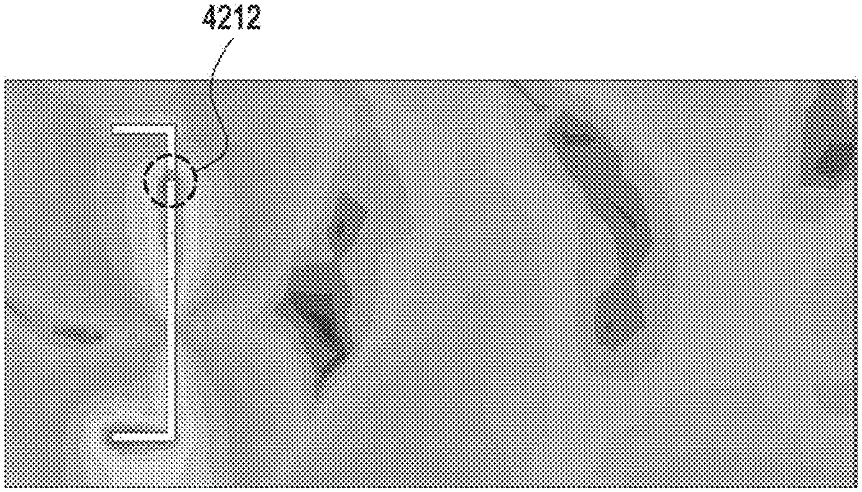

FIGS. 12A and 12B are a graph and a current distribution diagram illustrating resonance characteristics according to connection positions between an antenna structure and a feeding structure in an opened state of an electronic device according to various embodiments.

According to various embodiments, the electronic device 101 may include the first housing 201, the second housing 202, the antenna structure 400, the feeding structure 500, the flexible display 203, and the main circuit board 204.

The configurations of the first housing 201, the second housing 202, the antenna structure 400, the feeding structure 500, the flexible display 203, and the main circuit board 204 of FIGS. 9, 10, 11A, 11B, 12A and 12B may be wholly or partially identical to those of the first housing 201, the second housing 202, the antenna structure 400, the feeding structure 500, the flexible display 203, and the main circuit board 204 of FIGS. 5, 6, 7 and 8.

According to various embodiments, as the flexible display 203 connected to the first housing 201 slides in and out with respect to the second housing 202, the closed state or the opened state may be set. According to an embodiment, the flexible display 203 may include the first display area A1 which is connected to the first housing 201 and slidable in response to the sliding of the first housing 201, and the second display area A2 which extends from the first display area A1 and is bendable (e.g., rollable).

According to various embodiments, the antenna structure 400 may be formed in a partial area of the second housing 202. The antenna structure 400 may include the conductive part 410 and the slot part 420 formed in an area of the conductive part 410. The conductive part 410 may be one of outer plates (e.g., the second surface 221 of FIG. 5) of the second housing 202, which are formed of a metal material, and the slot part 420 may be formed in an area of the conductive part 410. For example, the slot part 420 may be an opening formed to penetrate at least a part of the outer plate.

According to various embodiments, the main circuit board 204 may be located in an inner space formed by the first housing 201 and the second housing 202. The main circuit board 204 may be fixed in an area inside the first housing 201 and slide in response to the sliding of the first housing 201. Accordingly, the feeding structure 500 disposed in an area of the main circuit board 204 may slide in response to the sliding of the main circuit board 204. The feeding structure 500 may change a feeding point of the antenna structure 400 formed on one surface of the second housing 202 according to the sliding.

Referring to FIG. 9, in the closed state of the first housing 201 with respect to the second housing 202, the first display area A1 of the flexible display 203 may be exposed (e.g., visible) to the outside, and the second display area A2 may be rolled and located at one end inside the second housing 202. According to an embodiment, the slot part 420 of the antenna structure 400 may be designed to be latitudinally symmetrical in shape with respect to the first axis P1 parallel to the rotation axis R1 around which the flexible display 203 is rolled. In the closed state of the first housing 201 with respect to the second housing 202, the feeding structure 500 may be electrically connected to a first point 4211 of the first slot part 421. For example, the first point 4211 may be a part of the first slot part 421 adjacent to the second slot part 422 or a part adjacent to the part. In another example, the feeding structure 500 may be provided as a conductive member such as a C-clip, and directly connected to the first point 4211 of the first slot part 421 to feed power or provide a ground.

Referring to FIG. 10, in the opened state of the first housing 201 with respect to the second housing 202, the flexible display 203 may provide an extended viewing area. For example, parts of the first display area A1 and the second display area A2 of the flexible display 203 may be exposed (e.g., visible) to the outside. According to an embodiment, the slot part 420 of the antenna structure 400 may be designed in a latitudinally symmetrical shape with respect to the first axis P1 parallel to the rotation axis R1 around which the flexible display 203 is rolled. In the opened state of the first housing 201 with respect to the second housing 202, the feeding structure 500 may be electrically connected to a second point 4212 of the first slot part 421. For example, the second point 4212 may be a part of the first slot part 421 adjacent to the third slot part 423 or a part adjacent to the part. In another example, the feeding structure 500 may be provided as a conductive member such as a C-clip, and directly connected to the second point 4212 of the first slot part 421 to feed power or provide a ground.

Referring to FIGS. 11A and 11B, antenna resonance characteristics in the closed state of the first housing 201 with respect to the second housing 202 (hereinafter, referred to as the closed state) are illustrated. Referring to FIGS. 12A and 12B, antenna resonance characteristics in the opened state of the first housing 201 with respect to the second housing 202 (hereinafter, referred to as the opened state) are illustrated. In the closed state and the open state of the electronic device, the feeding structure 500 and the antenna structure 400 may be kept electrically connected, and the first point 4211 and the second point 4212 as feeding portions in the antenna structure 400 may be close to symmetrical points of a mutually symmetrical structure. Accordingly, antenna frequencies generated in the antenna structure 400 in the closed state and the open state may provide similar resonance characteristics.

The graph of FIG. 11A and the current distribution of FIG. 11B illustrate an S parameter plot in the closed state, and it may be identified that as values of −6 dB or less are provided at approximately 1.6 GHz to 2.1 GHz and approximately 3.8 GHz to 4.3 GHz, thereby providing favorable antenna radiation characteristics.

The graph of FIG. 12A and the current distribution of FIG. 12B illustrate an S parameter plot in the opened state, and it may be identified that as values of −6 dB or less are provided at approximately 1.6 GHz to 2.1 GHz and approximately 3.8 GHz to 4.3 GHz, thereby providing favorable antenna radiation characteristics. Accordingly, the electronic device according to the disclosure may provide an antenna structure having similar resonance characteristics in the closed state and the opened state, because feeding positions of the antenna structure 400 are formed at symmetrical points of the slot part, respectively.

Figure 13A:
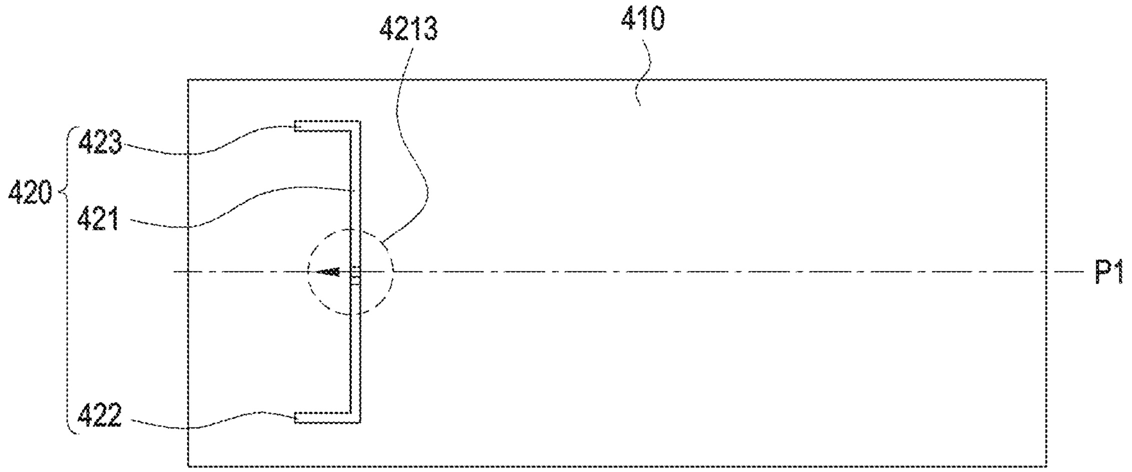
FIG. 13A is a diagram illustrating a connection relationship between an antenna structure and a feeding structure in a state transitioning from a closed state to an opened state or from the opened state to the closed state of an electronic device according to various embodiments.

FIG. 13A is a diagram illustrating a connection relationship between an antenna structure and a feeding structure in a state transitioning from the closed state to the opened state or from the opened state to the closed state of an electronic device according to various embodiments.

Figure 13B:
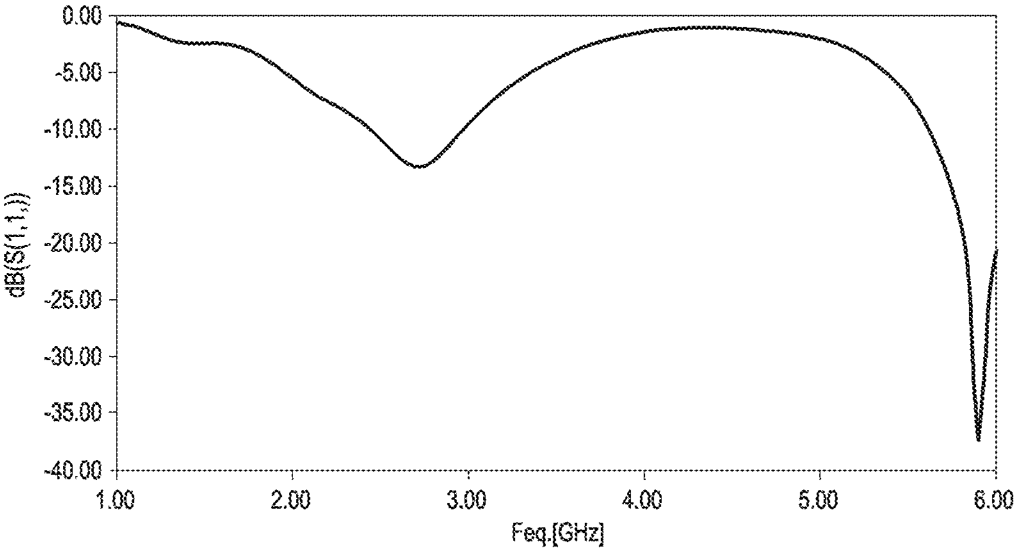
FIGS. 13B and 13C are a graph and a current distribution diagram illustrating resonance characteristics according to connection positions between an antenna structure and a feeding structure in a state transitioning from a closed state to an opened state or from the opened state to the closed state of an electronic device according to various embodiments.
Figure 13C:
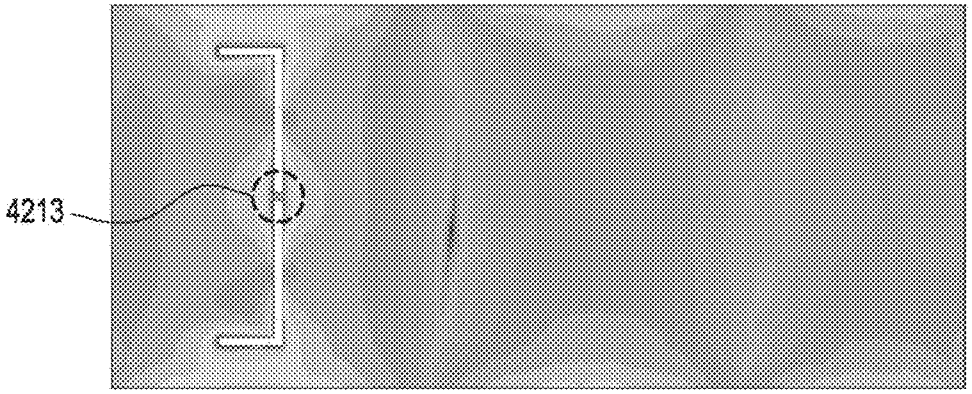

FIGS. 13B and 13C are a graph and current distribution diagram illustrating resonance characteristics according to connection positions between an antenna structure and a feeding structure in a state transitioning from the closed state to the opened state or from the opened state to the closed state of an electronic device according to various embodiments.

According to various embodiments, the electronic device 101 may include a first housing (e.g., the first housing 201 of FIG. 5), a second housing (e.g., the second housing 202 of FIG. 5), the antenna structure 400, a feeding structure (e.g., the feeding structure 500 of FIG. 6), and the main circuit board 204.

The configurations of the first housing, the second housing, the antenna structure 400, and the feeding structure disclosed for the description of FIGS. 13A to 13C may be wholly or partially identical to those of the first housing 201, the second housing 202, the antenna structure 400, and the feeding structure 500 of FIGS. 5 to 8.

According to various embodiments, as the first housing 201 (and the flexible display (not shown) connected to the first housing 201) slides in and out with respect to the second housing 202, the closed state or the opened state may be set. A state transitioning from the closed state to the opened state or from the opened state to the closed state may be defined as an intermediate state.

Referring to FIG. 13A, in the intermediate state of the first housing 201 with respect to the second housing 202, the first display area (e.g., the first display area A1 of FIG. 9) of the flexible display may be exposed (e.g., visible) to the outside, whereas a part of the second display area (e.g., the second display area A2 of FIG. 9) may be exposed (e.g., visible), and the other part thereof may be rolled and located at one end inside the second housing 202. According to an embodiment, the slot part 420 of the antenna structure 400 may be designed in a latitudinally symmetrical shape with respect to the first axis P1 parallel to the rotation axis along which the flexible display 203 is rolled. In the intermediate state of the first housing 201 with respect to the second housing 202, the feeding structure 500 may be electrically connected to a third point 4213 of the first slot part 421. For example, the third point 4213 may be a middle part of the first slot part 421. In another example, the feeding structure (e.g., the feeding structure 500 of FIG. 6) may be provided as a conductive member such as a C-clip, and directly contact the third point 4213 of the first slot part 421 to feed power or provide a ground.

Referring to FIGS. 13B and 13C, antenna resonance characteristics in the intermediate state of the first housing 201 with respect to the second housing 202 are illustrated. In the intermediate state of the electronic device, an antenna frequency generated by the antenna structure 400 may provide similar resonance characteristics in the closed and open states of the electronic device.

The graph of FIG. 13B and the current distribution diagram of FIG. 13C illustrate an S parameter plot in the intermediate state, and it is identified values of −6 dB or less are provided at approximately 2.2 GHz to 3.2 GHz and at approximately 5.6 GHz or higher, thereby providing favorable antenna radiation characteristics.

Figure 14A:
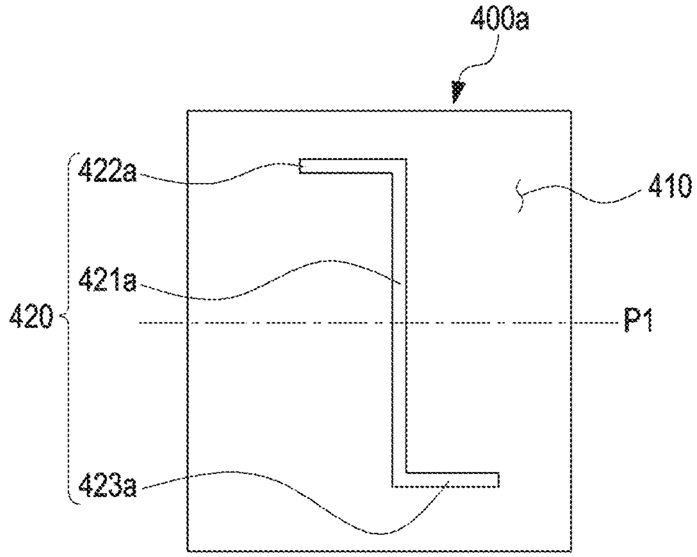
FIGS. 14A, 14B and 14C are diagrams illustrating various antenna structures in an electronic device according to various embodiments.
Figure 14B:
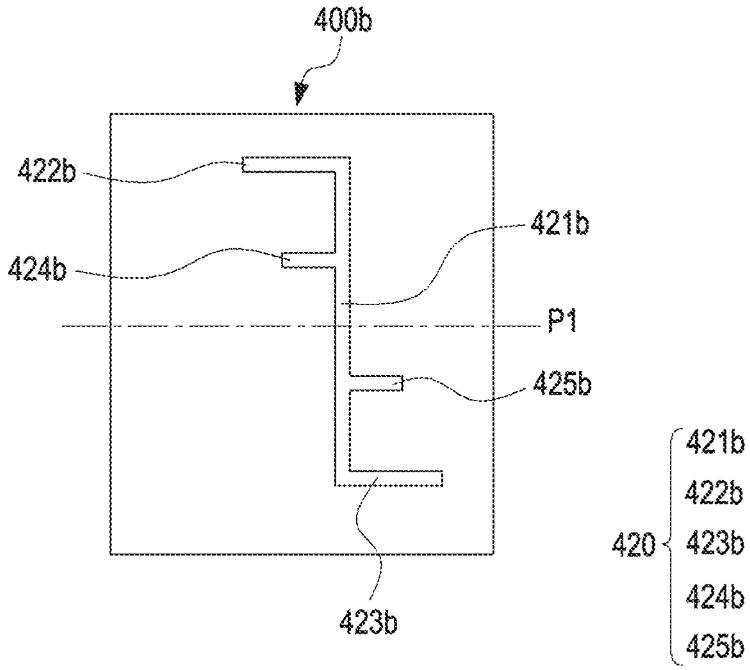
Figure 14C:
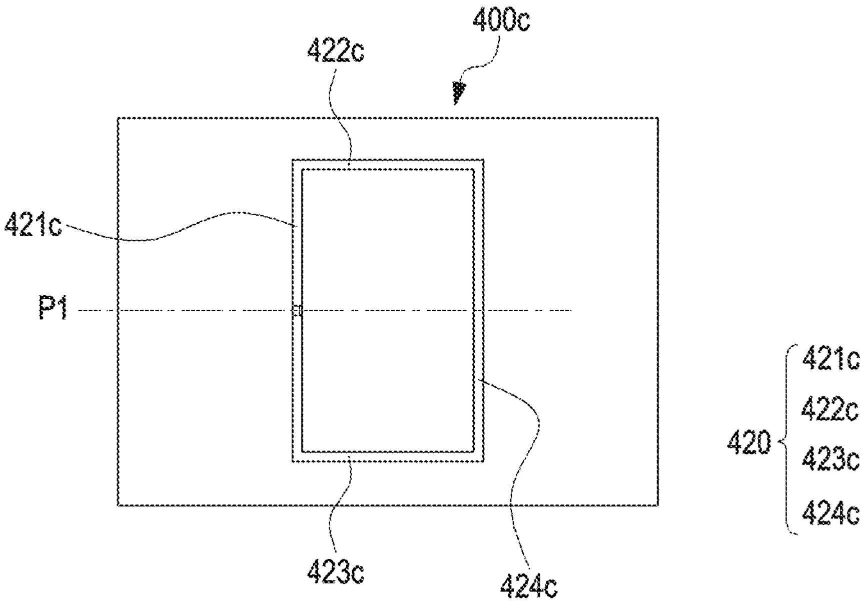

FIGS. 14A, 14B and 14C are diagrams illustrating various antenna structures in an electronic device according to various embodiments.

The configurations of antenna structures **400*a*, 400*b*, and 400*c* disclosed for a description of FIGS. 14A, 14B, and 14C may be wholly or partially identical to that of the antenna structure 400 of FIGS. 5, 6, 7 and 8**.

According to various embodiments, each of the antenna structures **400*a*, 400*b*, and 400*c* may include the conductive part 410 and the slot part 420 formed in an area of the conductive part 410. The conductive part 410 may be a part of a second plate (e.g., the second plate 221 of FIG. 5) of the second housing (e.g., the second housing 202 of FIG. 5) formed of a metal material, and the slot part 420 may be formed in an inner area (e.g., a central area) of the conductive part 410**.

According to various embodiments, the slot part 420 may be in a latitudinally or longitudinally symmetrical shape with respect to the first axis P1 perpendicular to a sliding direction of the flexible display (e.g., the flexible display 203 of FIG. 5).

Referring to FIG. 14A, the slot part 420 of the first antenna structure **400*a* may include a first part and a second part latitudinally symmetrical with respect to the first axis P1. For example, the slot part 420 may be formed in an opening structure, and may be a structure including a bent portion at one side. In another example, the slot part 420 may be in the shape of '┌┘' or '└┐'. In another example, the slot part 420 may include a (1-1)$^{th}$ slot part 421*a* perpendicular to the first axis P1, a (1-2)$^{th}$ slot part 422*a* extending from one end of the (1-1)$^{th}$ slot part 420*a*, and a (1-3)$^{th}$ slot part 423*a* extending from the other end of the (1-1)$^{th}$ slot part 420*a*. The (1-2)$^{th}$ slot part 422*a* and the (1-3)$^{th}$ slot part 423*a* may be formed parallel to the first axis P1 and spaced apart from each other. The (1-2)$^{th}$ slot part 422*a* and the (1-3)$^{th}$ slot part 423*a* may extend in opposite directions from the one and other ends of the (1-1)$^{th}$ slot part 421*a***.

Referring to FIG. 14B, the slot part 420 of the second antenna structure **400*b* may include a multi-slot structure longitudinally and latitudinally symmetrical with respect to the first axis P1. For example, the slot part 420 may be formed in an opening structure, and may be a structure including a bent portion at one side. In another example, the slot part 420 may include a (2-1)$^{th}$ slot part 421*b* perpendicular to the first axis P1, a (2-2)$^{th}$ slot part 422*b* extending from one end of the (2-1)$^{th}$ slot part 421*b*, and a (2-3)$^{th}$ slot part 423*b* extending from the other end of the (2-1)$^{th}$ slot part 422*b*. A (2-4)$^{th}$ slot part 424*b* may be formed between the center of the (2-1)$^{th}$ slot part 421*b* and the (2-2)$^{th}$ slot part 422*b* in parallel to the (2-2)$^{th}$ slot part 422*b*. A (2-5)$^{th}$ slot part 425*b* may be formed between the center of the (2-1)$^{th}$ slot part 421*b* and the (2-3)$^{th}$ slot part 423*b* in parallel to the (2-3)$^{th}$ slot part 423***b*. According to an embodiment, the (2-2)$^{th}$ slot part 422*b*, the (2-3)$^{th}$ slot part, the (2-4)$^{th}$ slot part 424*b*, and the (2-5)$^{th}$ slot part 425*b* may be formed parallel to the first axis P1 and spaced apart from each other. The (2-4)$^{th}$ slot part 424*b* may be designed to have a smaller length than the (2-2)$^{th}$ slot part 422*b*. The (2-5)$^{th}$ slot part 425*b* may be designed to have a smaller length than the (2-3)$^{th}$ slot part 423*b*. The (2-2)$^{th}$ slot part 422*b* (and the (2-4)$^{th}$ slot part 424*b*) and the (2-3)$^{th}$ slot part 423*b* (and the (2-5)$^{th}$ slot part 425*b*) may extend in opposite directions from the one and other ends of the (2-1)$^{th}$ slot part 421*b*.

Referring to FIG. 14C, the slot part 420 of the third antenna structure 400*c* may include a closed loop structure longitudinally and latitudinally symmetrical with respect to the first axis P1. For example, the slot part 420 may be formed in an opening structure, and may be a structure including a bent portion at one side. In another example, when the slot part 420 is a square closed loop structure, the slot part 420 may include a first slot part 421*c* perpendicular to the first axis P1, a second slot part 422*c* extending from one end of the first slot part 421*c*, a third slot part 423*c* extending from the other end of the first slot part 421*c*, and a fourth slot part 424*c* connecting the second slot part 422*c* and the third sot part 423*c* to each other.

Figure 15A:
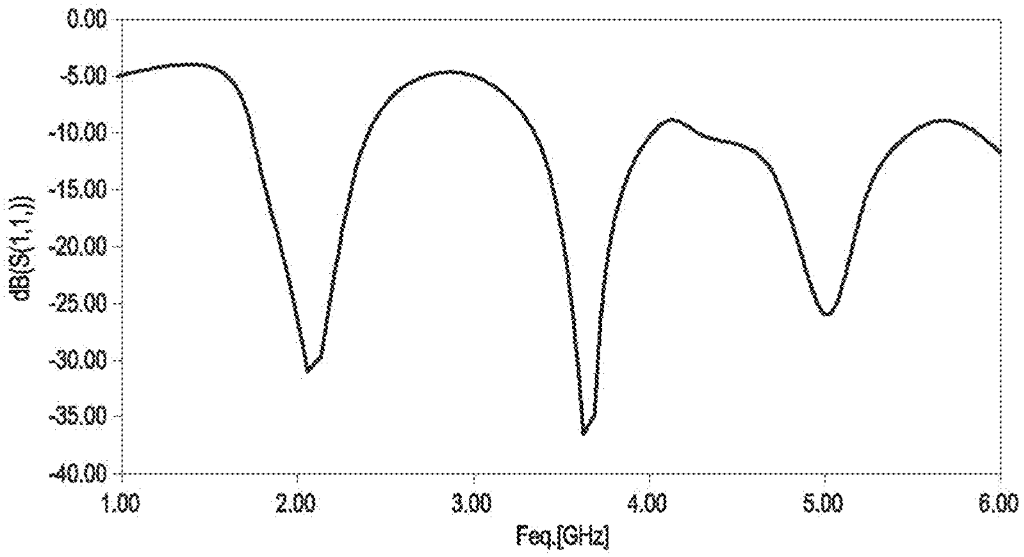
FIGS. 15A and 15B are a graph and current distribution diagram illustrating resonance characteristics according to connection positions between an antenna structure and a feeding structure in a closed state of an electronic device according to various embodiments.
Figure 15B:
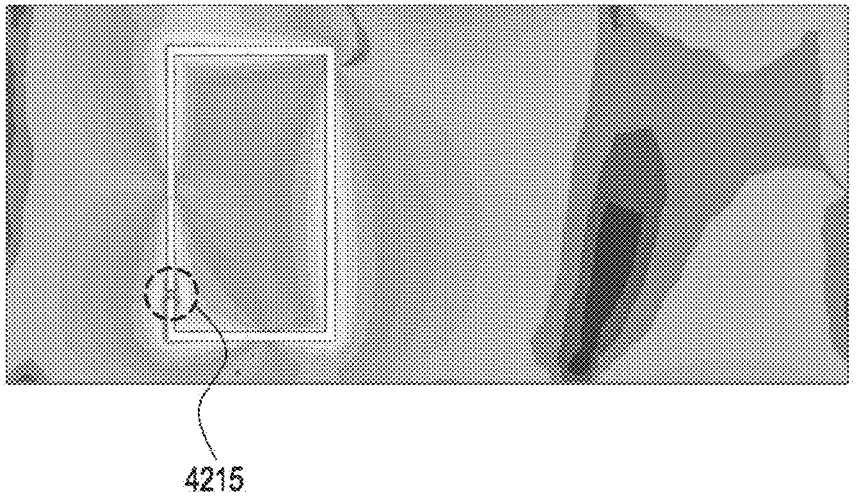

FIGS. 15A and 15B are a graph and current distribution diagram illustrating resonance characteristics according to connection positions between an antenna structure and a feeding structure in the closed state of an electronic device according to various embodiments.

Figure 16A:
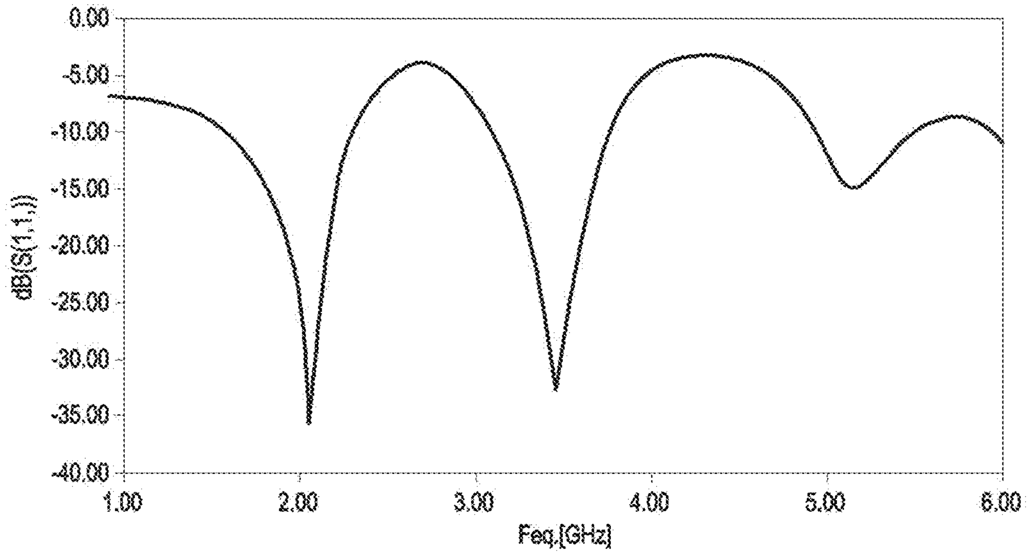
FIGS. 16A and 16B are a graph and current distribution diagram illustrating a connection relationship between an antenna structure and a feeding structure in a state transitioning from a closed state to an opened state or from the opened state to the closed state of an electronic device according to various embodiments.
Figure 16B:
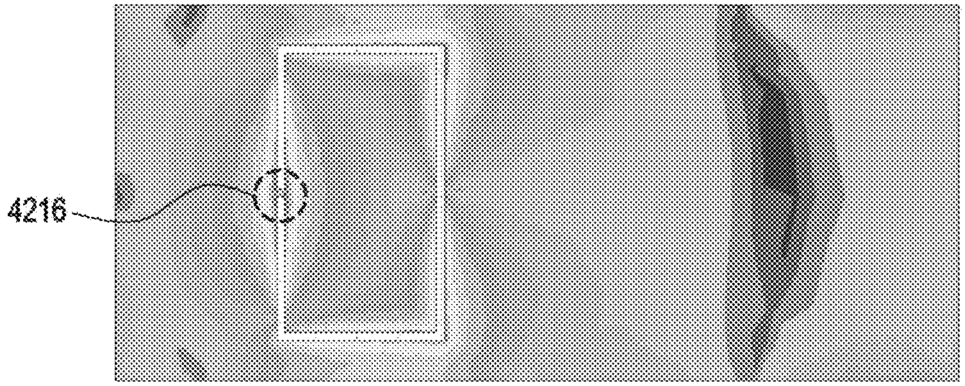

FIGS. 16A and 16B are a graph and current distribution diagram illustrating a connection relationship between an antenna structure and a feeding structure in a state (hereinafter, referred to as an intermediate state) transitioning from the closed state to the opened state or from the opened state to the closed state of an electronic device according to various embodiments.

Figure 17A:
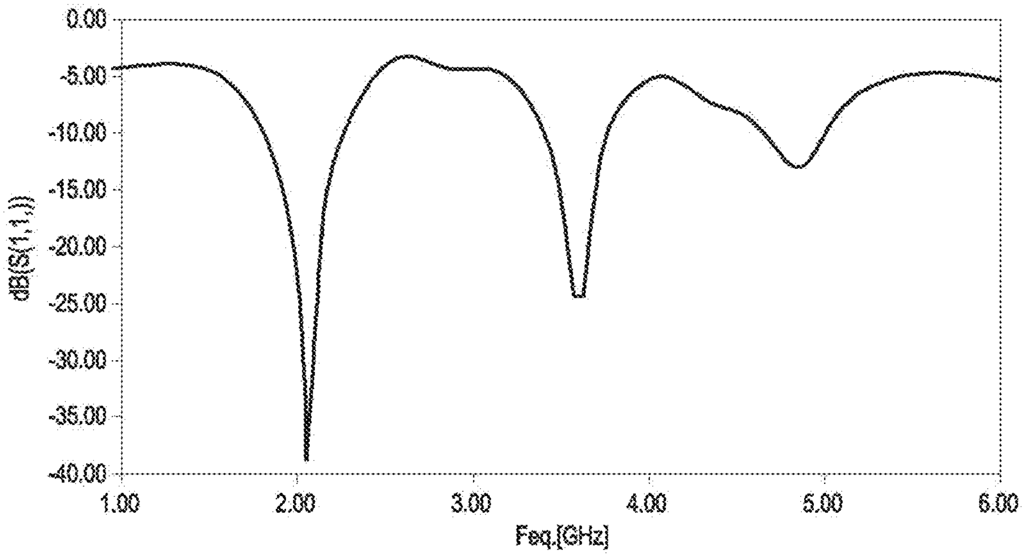
FIGS. 17A and 17B are a graph and current distribution diagram illustrating resonance characteristics according to connection positions between an antenna structure and a feeding structure in an open state of an electronic device according to various embodiments.
Figure 17B:
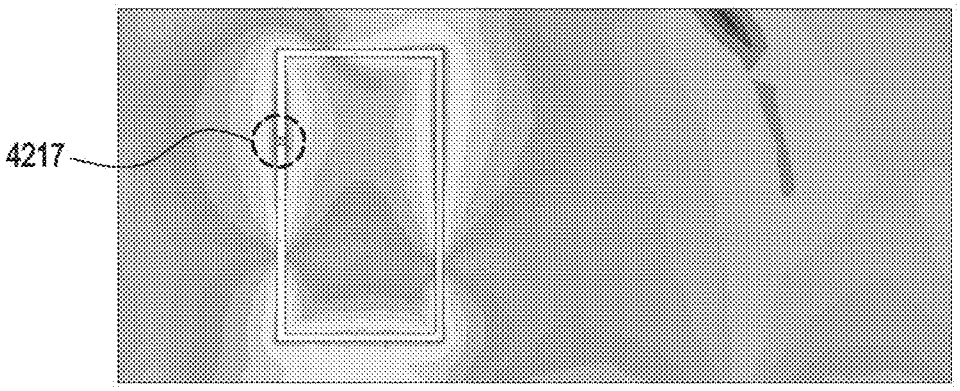

FIGS. 17A and 17B are a graph and current distribution diagram illustrating resonance characteristics according to connection positions between an antenna structure and a feeding structure in the opened state of an electronic device according to various embodiments.

FIGS. 15A, 15B, 16A, 16B, 17A and 17B are diagrams illustrating resonance characteristics generated by the third antenna structure 400*c* of FIG. 15C.

According to various embodiments, in the closed and opened states of the electronic device, a feeding structure (e.g., the feeding structure 500 of FIG. 6) and an antenna structure (e.g., the third antenna structure 400*c* of FIG. 15C) may be kept electrically connected, and a first point 4215 and a second point 4217 of the antenna structure, which are feeding portions, may be close to symmetrical points of a mutually symmetrical structure. In the intermediate state of the electronic device, the feeding structure and the antenna structure may be kept electrically connected, and a third point 4216 of the antenna structure, which is a feeding portion, may be located between the first point 4215 and the second point 4217. Antenna frequencies generated from the antenna structure in the closed, opened, and intermediate states of the electronic device may provide similar resonance characteristics.

The graph of FIG. 15A and the picture of FIG. 15B illustrate an S parameter plot in the closed state, and it may be identified that values of −6 dB or less are provided at approximately 1.8 GHz to 2.2 GHz, approximately 3.2 GHz to 4.0 GHz, and approximately 4.8 GHz to 5.4 GHz, thereby providing favorable antenna radiation characteristics.

The graph of FIG. 16A and the picture of FIG. 16B illustrate an S parameter plot in the intermediate stated, and as values of −6 dB or less are provided at approximately 1.8 GHz to 2.2 GHz, approximately 3.2 GHz to 4.0 GHz, and approximately 4.8 GHz to 5.4 GHz, thereby providing favorable antenna radiation characteristics.

The graph of FIG. 17A and the picture of FIG. 17B illustrate an S parameter plot in the opened state, and it may be identified that values of −6 dB or less are provided at approximately 1.8 GHz to 2.2 GHz, approximately 3.2 GHz to 4.0 GHz, and approximately 4.8 GHz to 5.4 GHz, thereby providing favorable antenna radiation characteristics. Accordingly, the electronic device according to the disclosure may provide an antenna structure which has feeding points formed at symmetrical points and a center point of the slot part in the closed state, the opened state, and the intermediate state and thus has similar resonance characteristics.

Figure 18A:
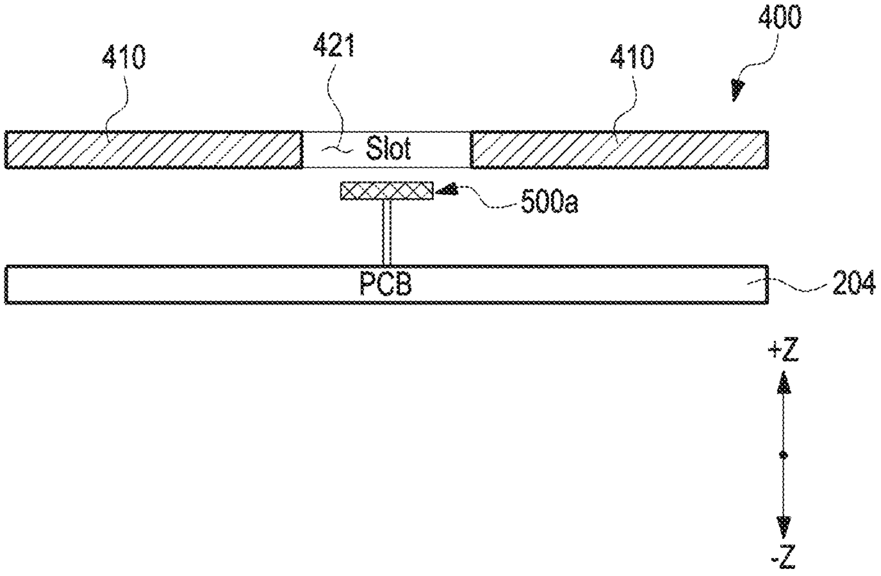
FIG. 18A is a cross-sectional view illustrating an antenna structure and a feeding structure in an electronic device according to various embodiments.

FIG. 18A is a cross-sectional view illustrating an antenna structure and a feeding structure in an electronic device according to various embodiments.

Figure 18B:
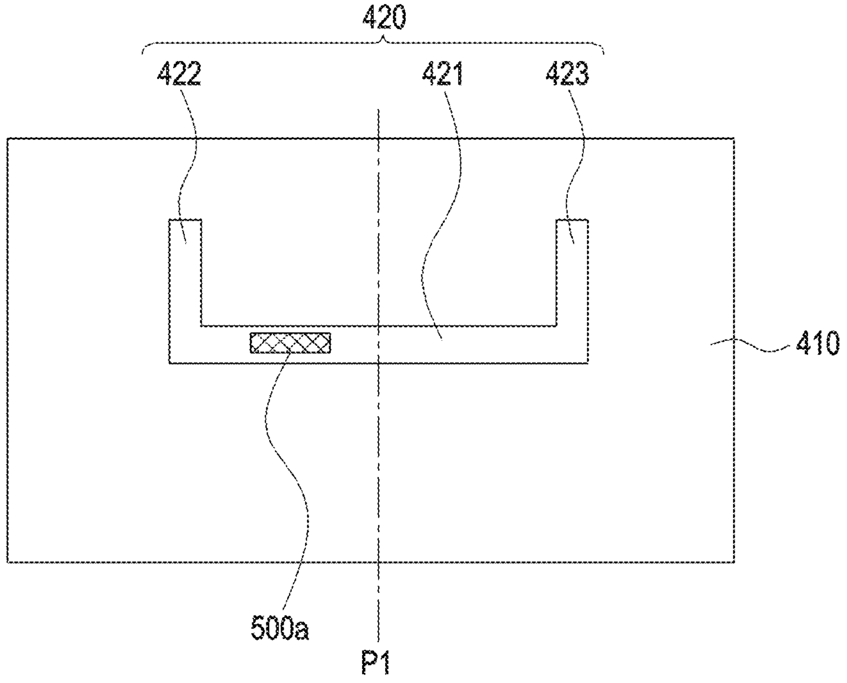
FIG. 18B is a diagram illustrating an antenna structure in an electronic device according to various embodiments.

FIG. 18B is a diagram illustrating an antenna structure in an electronic device according to various embodiments.

Figure 18C:
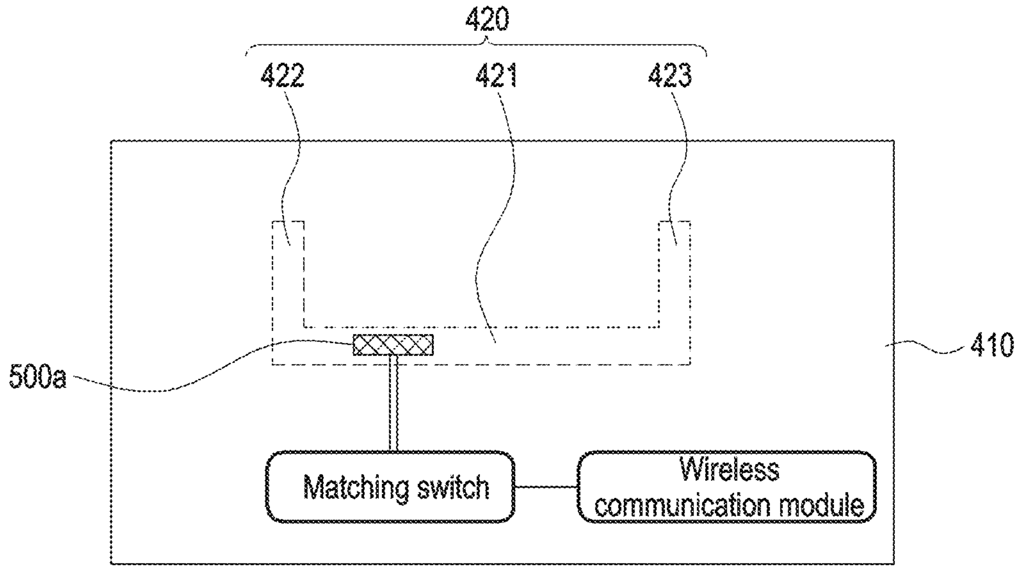
FIG. 18C is a projection view illustrating a feeding structure disposed on a printed circuit board according to various embodiments.

FIG. 18C is a projection view illustrating a feeding structure disposed on a printed circuit board according to various embodiments.

According to various embodiments, the electronic device 101 may include a first housing (e.g., the first housing 201 of FIG. 5), a second housing (e.g., the second housing 202 of FIG. 5), the antenna structure 400, a first feeding structure 500*a*, and the main circuit board 204.

The configurations of the first housing, the second housing, the antenna structure 400, and the first feeding structure 500*a* disclosed for a description of FIGS. 18A, 18B and 18C may be wholly or partially identical to those of the first housing 201, the second housing 202, the antenna structure 400, and the feeding structure 500 of FIGS. 5, 6, 7 and 8.

According to various embodiments, as the first housing 201 (and the flexible display (not shown) connected to the first housing 201) slides in and out with respect to the second housing 202, the closed state or the opened state may be set.

According to various embodiments, the second housing 202 may include a second plate (e.g., the second plate 221 of FIG. 5) facing in a direction opposite to the flexible display, and the antenna structure 400 may be formed in at least a partial area of a first surface of the second plate 221. The antenna structure 400 may include the conductive part 410 and the slot part 420 formed in an area of the conductive part 410. The conductive part 410 may be a part of the second plate 221 formed of a metal material, and the slot part 420 may be formed in an inner area (e.g., central area) of the conductive part 410. The slot part 420 may be an opening formed to penetrate at least a part of the first surface. According to an embodiment, the slot part 420 of the antenna structure 400 may be in a latitudinally symmetrical shape with respect to the first axis P1 perpendicular to the sliding direction of the first housing 201.

According to various embodiments, the first feeding structure 500*a* may be electrically connected to the main circuit board 204 inside the first housing 201, and feed power received from the main circuit board 204 to the antenna structure 400. For example, a part of the feeding structure 500*a* facing in the +Z axis direction may be fixedly disposed on the main circuit board 204, and the other part thereof facing in the −Z axis direction may be disposed to face the slot part 420 of the antenna structure 400. In another example, when viewed from above the second plate 221, the first feeding structure 500*a* may be disposed overlapping with the slot part 420 formed as an opening and thus exposed.

According to an embodiment, the first feeding structure 500*a* may be designed to be indirectly connected in response to sliding of a structure for power feeding (e.g., the antenna structure). For example, the first feeding structure 500*a* may be formed to include a conductive material for electrical connection, and disposed adjacent to the slot part 420 of the antenna structure 400, spaced apart from the slot part 420 of the antenna structure 400 to feed power to the antenna structure 400 by coupling. The first feeding structure 500*a* may be connected to a wireless communication module of the main circuit board 204 through a matching switch and transmit and receive RF signals.

Figure 19A:
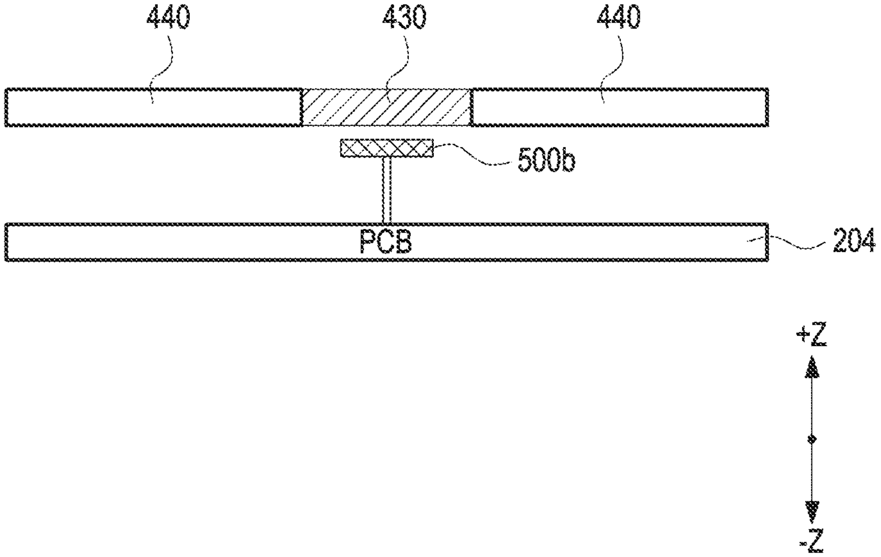
FIG. 19A is a cross-sectional view illustrating an antenna structure and a feeding structure in an electronic device according to various embodiments.

FIG. 19A is a cross-sectional view illustrating an antenna structure and a feeding structure in an electronic device according to various embodiments.

Figure 19B:
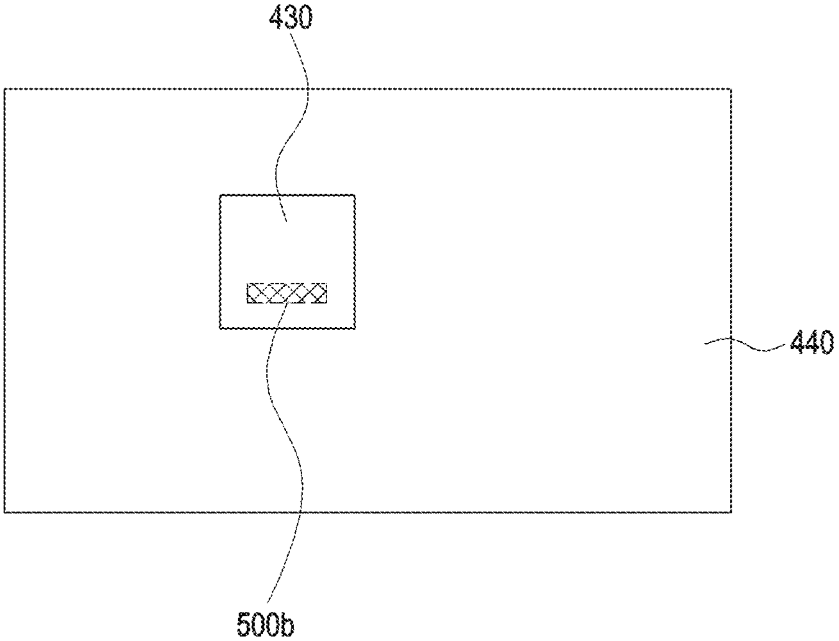
FIG. 19B is a diagram illustrating an antenna structure in an electronic device according to various embodiments.

FIG. 19B is a diagram illustrating an antenna structure in an electronic device according to various embodiments.

Figure 19C:
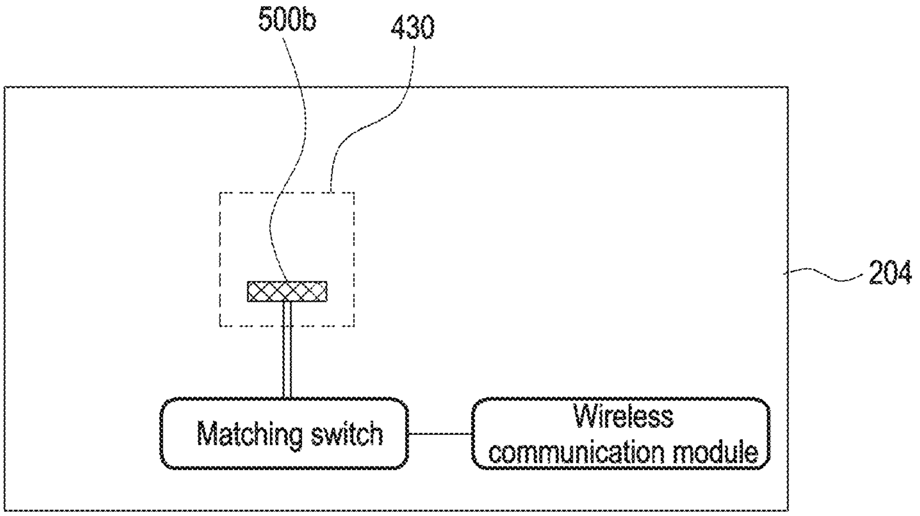
FIG. 19C is a projection view illustrating a feeding structure disposed on a printed circuit board according to various embodiments.

FIG. 19C is a projection view illustrating a feeding structure disposed on a printed circuit board according to various embodiments.

According to various embodiments, the electronic device 101 may include a first housing (e.g., the first housing 201 of FIG. 5), a second housing (e.g., the second housing 202 of FIG. 5), an antenna structure (e.g., a conductive plate structure 430), the second feeding structure 500*b*, and the main circuit board 204.

The configurations of the first housing, the second housing, the antenna structure, and the second feeding structure 500*b* disclosed for a description of FIGS. 19A, 19B and 19C may be wholly or partially identical to those of the first housing 201, the second housing 202, the antenna structure 400, and the feeding structure 500 of FIGS. 5 to 8.

According to various embodiments, as the first housing 201 (and the flexible display (not shown) connected to the first housing 201) slides in and out with respect to the second housing 202, the closed state or the opened state may be set.

According to various embodiments, the second housing 202 may include a second plate (e.g., the second plate 221 of FIG. 5) facing in a direction opposite to the flexible display, and the antenna structure 400 may be formed in at least a partial area of the first surface of the second plate 221. The antenna structure 400 may include a conductive material. For example, the second plate 221 may be a cover 440 formed of a non-metal material (e.g., by injection) as a whole, and the antenna structure may be designed as at least one patch-type conductive plate structure 430. The conductive plate structure 430 may be formed to penetrate an area of the second plate 221.

According to an embodiment, the conductive plate structure 430 may be in a latitudinally symmetrical shape with respect to the first axis (not shown) perpendicular to the sliding direction of the flexible display 203.

According to various embodiments, the second feeding structure 500*b* may be electrically connected to the main circuit board 204 inside the first housing 201, and feed power received from the main circuit board 204 to the conductive plate structure 430. For example, a part of the second feeding structure 500*b* facing in the +Z axis direction may be fixedly disposed on the main circuit board 204, and the other part thereof facing in the −Z axis direction may be disposed to face the conductive plate structure 430. In another example, when viewed from above the second plate 221, the second feeding structure 500*a* may be disposed overlapping with the conductive plate structure 430 in the form of a patch.

According to an embodiment, the second feeding structure 500*b* may be designed to be indirectly connected in response to sliding of a structure for power feeding (e.g., the antenna structure). For example, the second feeding structure 500*b* may be formed to include a conductive material for electrical connection, and disposed adjacent to the conductive plate structure 430, spaced apart from the conductive plate structure 430 to feed power to the conductive plate structure 430 by coupling. The second feeding structure 500*b* may be connected to the wireless communication module of the main circuit board 204 through a matching switch and transmit and receive RF signals.

An electronic device (e.g., the electronic device 101 of FIGS. 1 to 4) according to various example embodiments of the disclosure may include: a first housing (e.g., the first housing 201 of FIGS. 2 to 4), a second housing (e.g., the second housing 202 of FIGS. 2 to 4) configured to accommodate at least a part of the first housing and to guide sliding of the first housing, a flexible display (e.g., the display 203 of FIG. 4) including a first display area connected to the first housing and a second display area extending from the first display area and bendable or rollable, a circuit board (e.g., the circuit board 204 of FIG. 4) disposed inside the first housing and being slidable in response to the sliding of the first housing, an antenna structure including an antenna (e.g., the antenna structure 400 of FIG. 6) formed on an outer surface of the second housing and including a first part and a second part bilaterally symmetrical with respect to a first axis perpendicular to a direction of the sliding, and a feeding structure including a conductive line (e.g., the feeding structure 500 of FIG. 6) disposed on the circuit board and configured to feed power to the antenna structure. The feeding structure may be electrically connected to a first point of the first part in a slide-in state of the flexible display, the feeding structure may be electrically connected to a second point of the second part in a slide-out state of the flexible display, and the first point and the second point may be spaced apart from the first axis by a same distance.

According to various example embodiments, the feeding structure may be slidable in response to the sliding of the first housing.

According to various example embodiments, the antenna structure may include a conductive part (e.g., the conductive part 410 of FIG. 6) formed along a plate of the second housing and a slot part (e.g., the slot part 420 of FIG. 6) surrounded by the conductive part.

According to various example embodiments, the slot part may be an opening penetrating at least a part of the plate of the second housing.

According to various example embodiments, the slot part may be provided in a closed loop shape bilaterally symmetrical with respect to the first axis.

According to various example embodiments, the slot part may include: a first slot part (e.g., the first slot part 421 of FIG. 6) perpendicular to the first axis, a second slot part (e.g., the second slot part 422 of FIG. 6) extending from one end of the first slot part, and a third slot part (e.g., the third slot part 423 of FIG. 6) extending from the other end of the first slot part, and the second slot part and the third slot part may be parallel to the first axis and spaced apart from each other.

According to various example embodiments, the first point may be a part of the first slot part adjacent to the second slot part or a part adjacent to the part, and the second point may be a part of the first slot part adjacent to the third slot part or a part adjacent to the part.

According to various example embodiments, the feeding structure may include a first feeding member comprising a conductive material (e.g., the first feeding member 510 of FIG. 6) and a second feeding member comprising a conductive material (e.g., the second feeding member 520 of FIG. 6) spaced apart from each other with the first slot part of the slot part interposed therebetween.

According to various example embodiments, the first feeding member may include a feeding line configured to feed power to the antenna structure, and the second feeding member may include a ground line configured to provide a ground of the antenna structure.

According to various example embodiments, the feeding structure may include a conductive material for an electrical connection to the antenna structure, and the feeding structure may include at least one of a C-clip, a pogo pin, a ball bearing, or a conductive plate.

According to various example embodiments, the feeding structure may directly contact an area of the conductive part of the antenna structure.

According to various example embodiments, the feeding structure may be overlap with the slot part of the antenna structure and formed to be coupled.

According to various example embodiments, a first resonance characteristic formed by the antenna structure in the slide-in state of the flexible display may be similar to a second resonance characteristic formed by the antenna structure in the slide-out state of the flexible display.

According to various example embodiments, the feeding structure may be configured to maintain electrical connection to the antenna structure and to feed power, based on the first housing sliding with respect to the second housing, and a third resonance characteristic formed by the antenna structure during the sliding may be similar to the first resonance characteristic and/or the second resonance characteristic.

According to various example embodiments, the antenna structure may be a patch-shaped conductive plate structure, and the feeding structure may be configured to perform the sliding, while overlapping with at least a part of the conductive plate structure.

An electronic device (e.g., the electronic device 101 of FIGS. 1 to 4) according to various example embodiments of the disclosure may include: a first housing (e.g., the first housing 201 of FIGS. 2 to 4), a second housing (e.g., the second housing 202 of FIGS. 2 to 4) configured to accommodate at least a part of the first structure and to guide sliding of the first housing, a flexible display (e.g., the display 203 of FIG. 4) including a first display area connected to the first housing and a second display area extending from the first display area and bendable or rollable, a circuit board (e.g., the circuit board 204 of FIG. 4) disposed inside the first housing, a slot antenna (e.g., the antenna structure 400 of FIG. 6) formed on an outer surface of the second housing and having a latitudinally or longitudinally symmetrical shape, and a feeding structure comprising a conductive line (e.g., the feeding structure 500 of FIG. 6) disposed on the circuit board, and being slidable in response to the sliding of the first housing, and configured to feed power to the slot antenna.

According to various example embodiments, the slot antenna may include a conductive part formed along a plate of the second housing and a slot part surrounded by the conductive part.

According to various example embodiments, the slot part may include a first slot part perpendicular to a direction of the sliding, a second slot part extending from one end of the first slot part, and a third slot part extending from the other end of the first slot part, and the second slot part and the third slot part may be parallel to the first axis and spaced apart from each other.

According to various example embodiments, the feeding structure may include a first feeding member comprising a conductive material and a second feeding member comprising a conductive material spaced apart from each other with the first slot part of the slot part interposed therebetween.

According to various example embodiments, the circuit board may be configured to slide in response to the sliding of the first housing.

The above-described antenna structure and electronic device including the same according to various embodiments of the disclosure are not limited by the forgoing embodiments and drawings, and it will be apparent to those skilled in the art that many replacements, changes, and modifications can be made within the technical scope of the disclosure, including the appended claims and their equivalents. It will also be understood that any of the embodiment(s) described herein may be used in conjunction with any other embodiment(s) described herein.

What is claimed is:

1. An electronic device comprising:

a first housing;

a second housing configured to accommodate at least a part of the first housing and to guide sliding of the first housing;

a flexible display including a first display area connected to the first housing and a second display area extending from the first display area and being bendable and/or rollable;

a circuit board disposed inside the first housing and configured to be slidable in response to the sliding of the first housing;

an antenna structure formed on an outer surface of the second housing and having a bilaterally symmetrical shape with respect to a first axis perpendicular to a direction of the sliding; and a feeding structure disposed on the circuit board and configured to be electrically connected to the antenna structure and feed power to the antenna structure in a slide-in state of the flexible display, in a slide-out state of the flexible display, and while the first housing is sliding with respect to the second housing, wherein the feeding structure is configured to be electrically connected to a first point of the antenna structure in the slide-in state of the flexible display, and the feeding structure is configured to be electrically connected to a second point of the antenna structure in the slide-out state of the flexible display, and wherein the first point and the second point are spaced apart from the first axis by a same distance.

2. The electronic device of claim 1, wherein the feeding structure is slidable in response to the sliding of the first structure.

3. The electronic device of claim 1, wherein the antenna structure includes a conductive part formed along a plate of the second housing and a slot part surrounded by the conductive part.

4. The electronic device of claim 3, wherein the slot part includes an opening penetrating at least a part of the plate of the second housing.

5. The electronic device of claim 3, wherein the slot part has a closed loop shape bilaterally symmetrical with respect to the first axis.

6. The electronic device of claim 3, wherein the slot part includes a first slot part perpendicular to the first axis, a second slot part extending from one end of the first slot part, and a third slot part extending from the other end of the first slot part, and wherein the second slot part and the third slot part are parallel to the first axis and spaced apart from each other.

7. The electronic device of claim 6, wherein the first point is a part of the first slot part adjacent to the second slot part, and wherein the second point is a part of the first slot part adjacent to the third slot part.

8. The electronic device of claim 6, wherein the feeding structure includes a first feeding member and a second feeding member spaced apart from each other with the first slot part of the slot part interposed therebetween.

9. The electronic device of claim 6, wherein the first feeding member includes a feeding line configured to feed power to the antenna structure, and the second feeding member includes a ground line configured to provide a ground of the antenna structure.

10. The electronic device of claim 3, wherein the feeding structure includes a conductive material for an electrical connection to the antenna structure, and wherein the feeding structure includes at least one of a C-clip, a pogo pin, a ball bearing, or a conductive plate.

11. The electronic device of claim 10, wherein the feeding structure is configured to directly contact an area of the conductive part of the antenna structure.

12. The electronic device of claim 10, wherein the feeding structure is disposed to overlap the slot part of the antenna structure and configured to be coupled.

13. The electronic device of claim 2, wherein a first resonance characteristic formed by the antenna structure in the slide-in state of the flexible display is substantially the same as a second resonance characteristic formed by the antenna structure in the slide-out state of the flexible display.

14. The electronic device of claim 13, wherein the feeding structure is configured to maintain electrical connection to the antenna structure and to feed power, while the first structure slides with respect to the second structure, and wherein a third resonance characteristic formed by the antenna structure during the sliding is substantially the same as the first resonance characteristic and/or the second resonance characteristic.

15. The electronic device of claim 2, wherein the antenna structure is a patch-shaped conductive plate structure, and wherein the feeding structure is configured to perform the sliding, while overlapping with at least a part of the conductive plate structure.

16. An electronic device comprising:

a first housing;

a second housing configured to accommodate at least a part of the first housing and to guide sliding of the first housing;

a flexible display including a first display area connected to the first housing and a second display area extending from the first display area and being bendable and/or rollable;

a circuit board disposed inside the first housing;

a slot antenna formed on an outer surface of the second housing and having a latitudinally or longitudinally symmetrical shape; and a feeding structure disposed on the circuit board, and being slidable in response to the sliding of the first housing, and configured to be electrically connected to the slot antenna and feed power to the slot antenna in a slide-in state of the flexible display, in a slide-out state of the flexible display, and while the first housing is sliding with respect to the second housing, wherein the feeding structure is configured to be electrically connected to a first point of the slot antenna in the slide-in state of the flexible display, and the feeding structure is configured to be electrically connected to a second point of the slot antenna in the slide-out state of the flexible display.

17. The electronic device of claim 16, wherein the slot antenna includes a conductive part formed along a plate of the second housing and a slot part surrounded by the conductive part.

18. The electronic device of claim 17, wherein the slot part includes a first slot part perpendicular to a direction of the sliding, a second slot part extending from one end of the first slot part, and a third slot part extending from the other end of the first slot part, and the second slot part and the third slot part are parallel to the first axis and spaced apart from each other.

19. The electronic device of claim 18, wherein the feeding structure includes a first feeding member and a second feeding member spaced apart from each other with the first slot part of the slot part interposed therebetween.

20. The electronic device of claim 16, wherein the circuit board is configured to slide in response to the sliding of the first housing.

* * * * *